(12) United States Patent
Chiwata

(10) Patent No.: US 7,484,824 B2
(45) Date of Patent: *Feb. 3, 2009

(54) IMAGE RECORDING APPARATUS AND METHOD, AND METHOD OF SPECIFYING DENSITY CORRECTION COEFFICIENTS

(75) Inventor: Yuhei Chiwata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 221 days.

This patent is subject to a terminal disclaimer.

(21) Appl. No.: 11/435,922

(22) Filed: May 18, 2006

(65) Prior Publication Data

US 2006/0262151 A1 Nov. 23, 2006

(30) Foreign Application Priority Data

May 20, 2005 (JP) ............................. 2005-148498

(51) Int. Cl.
*B41J 29/393* (2006.01)
(52) U.S. Cl. ......................................... 347/19; 358/1.9
(58) Field of Classification Search ................... 347/19, 347/101, 104, 105, 5, 9, 15; 358/1.2, 1.9, 358/296, 502
See application file for complete search history.

(56) References Cited

U.S. PATENT DOCUMENTS 5,038,208 A * 8/1991 Ichikawa et al. ............ 358/502

(Continued)

FOREIGN PATENT DOCUMENTS

JP 4-18363 A 1/1992

JP 2004-58282 A 2/2004

OTHER PUBLICATIONS

F.W. Campbell et al., "Application of Fourier Analysis to the Visibility of Gratings," J. Physiol. (1968), 197, pp. 551-566.

(Continued)

*Primary Examiner*—Lamson D Nguyen
(74) *Attorney, Agent, or Firm*—Birch, Stewart, Kolasch & Birch, LLP

(57) ABSTRACT

The image recording apparatus comprises: a recording head which has a plurality of recording elements; a conveyance device which causes the recording head and a recording medium to move relatively to each other by conveying at least one of the recording head and the recording medium; a characteristics information acquisition device which acquires information that indicates recording characteristics of the recording elements; a correction object recording element specification device which specifies a correction object recording element from among the plurality of recording elements, a density non-uniformity caused by the recording characteristic of the correction object recording element being corrected; a correction range setting device which sets N correction recording elements (where N is an integer larger than 1) from among the plurality of recording elements, the N correction recording elements being used in correction of output density; a correction coefficient specification device which calculates the density non-uniformity caused by the recording characteristic of the correction object recording element, and specifies density correction coefficients for the N correction recording elements according to correction conditions that reduce a low-frequency component of a power spectrum representing spatial frequency characteristics of the calculated density non-uniformity; a correction processing device which performs calculation for correcting the output density by using the density correction coefficients specified by the correction coefficient specification device; and a drive control device which controls driving of the recording elements according to correction results produced by the correction processing device.

13 Claims, 15 Drawing Sheets

U.S. PATENT DOCUMENTS

| | | | |
|---|---|---|---|
| 5,084,758 A | * | 1/1992 | Danzuka et al. ............. 358/296 |
| 5,276,459 A | | 1/1994 | Danzuka et al. |
| 2004/0104951 A1 | | 6/2004 | Shibata et al. |
| 2007/0132804 A1 | * | 6/2007 | Chiwata ...................... 347/19 |

OTHER PUBLICATIONS

R. P. Dooley et al., "Noise Perception in Electrophotography," Journal of Applied Photographic Engineering, vol. 5, No. 4, Fall 1979, pp. 190-196.

* cited by examiner

Z(3→2)=0.0
Z(3→3)=0.8
Z(3→4)=0.2

IMAGE RECORDING APPARATUS AND METHOD, AND METHOD OF SPECIFYING DENSITY CORRECTION COEFFICIENTS

BACKGROUND OF THE INVENTION

1. Field of the Invention

The present invention relates to an image recording apparatus and method, and a method of specifying density correction coefficients, and more particularly to image processing technology which is suitable for correcting density variations caused by variation in characteristics between recording elements of a recording head having a plurality of recording elements.

2. Description of the Related Art

In an image recording apparatus (inkjet printer) having an inkjet type of recording head comprising a plurality of ink ejection ports (nozzles), problems of image quality arise due to the occurrence of density variations (density non-uniformities) in the recorded image caused by variations in the ejection characteristics of the nozzles. FIG. 15 is an illustrative diagram showing a schematic view of examples of variations in the ejection characteristics of the nozzles, and density variations appearing the recording result.

In FIG. 15, a line head 300 has nozzles 302-$i$ (where i=1 to 8), which eject droplets of ink toward a recording medium (for example, recording paper) to form dots 304-$i$ (i=1 to 8), respectively, on the recording medium. The recording medium is moved in the direction of an arrow S (the sub-scanning direction) relatively with respect to the line head 300.

In the example shown in FIG. 15, a depositing position error occurs at the nozzle 302-3, which is third from the left (namely, the droplet ejected from the nozzle 302-3 lands on the recording medium at a position diverging from the originally intended depositing position in the leftward direction in FIG. 15), and a droplet volume error occurs at the sixth nozzle 302-6 (namely, the droplet ejected from the nozzle 302-6 has a greater droplet volume than the originally intended volume). In this case, density non-uniformity streaks occur at the positions in the print image corresponding to the nozzles 302-3 and 302-6 producing the depositing position error and the droplet volume error (namely, the positions indicated by A and B in FIG. 15).

In the case of a serial or shuttle-scanning type of image recording apparatus, which performs image recording by driving a recording head to scan a plurality of times over the prescribed print region, it is possible to avoid density non-uniformities by means of a commonly known multi-pass printing method, but in the case of a line head system (full width array) which records images by means of a single scanning action, it is difficult to avoid density non-uniformities.

Since it is difficult to completely prevent variations in ejection characteristics between the nozzles in manufacturing terms, then various technologies for correcting the variations have been proposed (see, Japanese Patent Application Publication Nos. 04-018363 and 2004-058282). As shown in FIG. 15, the principal causes of density non-uniformities are variation in the droplet volume and variation in the depositing position. Japanese Patent Application Publication No. 04-018363 chiefly discloses technology for correcting density non-uniformities caused by error in the droplet volume. Japanese Patent Application Publication No. 2004-058282 chiefly discloses technology for correcting density non-uniformities caused by error in the depositing position.

The principles of correction methods in the related art are now described generally with reference to FIG. 16. In FIG. 16, the third nozzle from the left (NZ3) has a depositing position error (namely, characteristics whereby the droplet ejected from the nozzle NZ3 lands on the recording medium at a position diverging from the originally intended depositing position, in the rightward direction in the diagram). The graph shown in the bottom part of FIG. 16 indicates the density profile in the nozzle column direction (main scanning direction), in which the print density produced by the droplets ejected from the nozzles is averaged per nozzle in the conveyance direction of the recording medium (the sub-scanning direction). The horizontal axis (X axis) represents the position in the main scanning direction, and the vertical axis represents the optical density (O.D.).

In general terms, the correction principle described in Japanese Patent Application Publication No. 04-018363 is as described below.

Step 1: Firstly, the densities of areas (density measurement areas AR1 to AR5) corresponding to the ideal positions of nozzles NZ1 to NZ5 are measured (or they are calculated arithmetically from a prescribed model).

Step 2: The nozzle output values are specified on the basis of the area densities thus measured (or calculated), in such a manner that the area densities are made uniform.

In the case of FIG. 16, the density of the area AR3 is reduced in comparison with ideal droplet ejection (as indicated by the dashed line), whereas the density of the area AR4 is increased. Therefore, processing (output value correction) is carried out in order to raise the output value of the nozzle NZ3 and reduce the output value of the nozzle NZ4, in qualitative terms. This is equivalent to controlling the height of the peak in each density measurement area, but this does not necessarily require control of the ejection volume of each nozzle, but rather, the output value can be controlled on an average basis, by modifying the number of dots in the sub-scanning direction printed by each nozzle. The number of dots can be adjusted by controlling the image processing, and therefore it allows the density to be corrected in a simple fashion.

Japanese Patent Application Publication No. 2004-058282 discloses correction processing which can be regarded as an improvement of the correction processing disclosed in Japanese Patent Application Publication No. 04-018363. To give a general description of the correction processing according to Japanese Patent Application Publication No. 2004-058282, (1) firstly, depositing position error information for each nozzle is acquired by means of a special test pattern; (2) the density characteristics of the print area corresponding to a particular nozzle are inferred by taking account of the effects of depositing position errors in the adjacent nozzles; and (3) output correction is carried out on the basis of the inferred density characteristics.

As shown in FIG. 17, weighting relationship Z(NZ→AR) between the nozzle output and the area density is designated, and a nozzle control amount is specified on the basis of this weighting relationship Z, in such a manner that the area densities become uniform. FIG. 17 shows an example of weighting of the nozzle output, and the weighting relationship is specified by taking account of the surface area occupied by the dots, and the dot density profile (which is generally an approximate hemispherical shape as shown in FIG. 17).

In the case of the nozzle NZ3 shown in FIG. 16, for example, taking account of the effects (density contribution) of the dot density profile (solid line) created due to the depositing position error, on the areas AR2, AR3 and AR4 as shown in FIG. 17, the values of the weighting relationship Z are Z(3→2)=0.0, Z(3→3)=0.8, and Z(3→4)=0.2. By using such weighting relationship Z, the inconsistency between the nozzle position and the area position is removed, and control can be implemented more precisely in order to make the area densities uniform.

SUMMARY OF THE INVENTION

However, these methods have the problems described below in terms of their principles, and although they may reduce density non-uniformities to some degree, it is difficult to achieve a state where such density non-uniformities are completely invisible.

It is generally known that the visibility of a spatial structure, such as density non-uniformities can be evaluated accurately on the basis of the spatial frequency characteristics (see "Application of Fourier Analysis to the Visibility of Gratings", F. W. Campbell and J. G. Robson, Journal of Physiology, Vol. 197, pp. 551-566 (1968); and "Noise Perception in Electrophotography", R. P. Dooley and R. Shaw, Journal of Applied Photographic Engineering, Vol. 5, pp. 190-196 (1979)). According to these references, it is clear that human vision has high sensitivity to low-frequency components, and this sensitivity declines as the frequency increases. In other words, it is suitable to use the low-frequency energy of the spatial frequency characteristics as a measure of the visibility of a density non-uniformity.

According to the technology disclosed in Japanese Patent Application Publication Nos. 04-018363 and 2004-058282, correction is performed in order that the area densities are all equal, but this does not necessarily mean that the low-frequency energy is minimized. More specifically, since the regular arrangement of the density profile outputted by the nozzles (the density peak shape shown in FIG. 16) is disrupted by the effects of variations in the depositing positions, then this may leave residual low-frequency energy.

The present invention has been contrived in view of the aforementioned circumstances, an object thereof being to provide an image recording apparatus and image recording method capable of accurately correcting density non-uniformities arising due to errors in the recording characteristics of recording elements, and to provide a method of specifying density correction coefficients which are valuable in the related correction processing.

In order to attain the aforementioned object, the present invention is directed to an image recording apparatus, comprising: a recording head which has a plurality of recording elements; a conveyance device which causes the recording head and a recording medium to move relatively to each other by conveying at least one of the recording head and the recording medium; a characteristics information acquisition device which acquires information that indicates recording characteristics of the recording elements; a correction object recording element specification device which specifies a correction object recording element from among the plurality of recording elements, a density non-uniformity caused by the recording characteristic of the correction object recording element being corrected; a correction range setting device which sets N correction recording elements (where N is an integer larger than 1) from among the plurality of recording elements, the N correction recording elements being used in correction of output density; a correction coefficient specification device which calculates the density non-uniformity caused by the recording characteristic of the correction object recording element, and specifies density correction coefficients for the N correction recording elements according to correction conditions that reduce a low-frequency component of a power spectrum representing spatial frequency characteristics of the calculated density non-uniformity; a correction processing device which performs calculation for correcting the output density by using the density correction coefficients specified by the correction coefficient specification device; and a drive control device which controls driving of the recording elements according to correction results produced by the correction processing device.

As stated above, irregularities in the density of a recorded image (density non-uniformities) can be represented by the intensity of the spatial frequency characteristics (power spectrum), and the visibility of a density non-uniformity can be evaluated by means of the low-frequency component of the power spectrum. In the present invention, density correction coefficients are specified by using conditions that reduce the low-frequency component of the power spectrum after correction on the basis of the density correction coefficients. Therefore, highly accurate correction of non-uniformities can be achieved.

The "characteristics information acquisition device" may acquire information by storing information relating to recording failure positions, previously, in a storage device such as a memory, and then reading out the required information, or it may acquire information relating to recording characteristics by printing an actual test pattern, or the like, and then reading in and analyzing the print results. Considering that the recording characteristics change over time, a desirable mode is one in which the information is updated at suitable times.

The inkjet recording apparatus according to one mode of the image recording apparatus of the present invention comprises: a liquid ejection head (corresponding to a "recording head") having a droplet ejection element row in which a plurality of droplet ejection elements (corresponding to "recording elements") are arranged in a row, each droplet ejection element including a nozzle for ejecting an ink droplet in order to form a dot and a pressure generating device (piezoelectric element, heating element, or the like) which generates an ejection pressure; and an ejection control device which controls the ejection of droplets from the recording head on the basis of ink ejection data generated from the image data. An image is formed on a recording medium by means of the droplets ejected from the nozzles.

A compositional embodiment of recording head is a full line type head having a recording element row in which a plurality of recording elements (nozzles) are arranged through a length corresponding to the full width of the recording medium. In this case, a mode may be adopted in which a plurality of relatively short recording head modules having recording element rows which do not reach a length corresponding to the full width of the recording medium are combined and joined together, thereby forming recording element rows of a length that correspond to the full width of the recording medium.

A full line type head is usually disposed in a direction that is perpendicular to the relative feed direction (relative conveyance direction) of the recording medium, but a mode may also be adopted in which the recording head is disposed following an oblique direction that forms a prescribed angle with respect to the direction perpendicular to the conveyance direction.

"Recording medium" indicates a medium on which an image is recorded by means of the action of the recording head (this medium may also be called an image forming medium, print medium, image receiving medium, or, in the case of an inkjet recording apparatus, an ejection medium or ejection receiving medium, or the like). This term includes various types of media, irrespective of material and size, such as continuous paper, cut paper, sealed paper, resin sheets, such as OHP sheets, film, cloth, an intermediate transfer body, a printed circuit board on which a wiring pattern, or the like, is printed by means of an inkjet recording apparatus, and the like.

The "conveyance device" may include a mode where the recording medium is conveyed with respect to a stationary (fixed) recording head, or a mode where a recording head is moved with respect to a stationary recording medium, or a mode where both the recording head and the recording medium are moved.

When forming color images by means of an inkjet head, it is possible to provide recording heads for inks of a plurality of colors (recording liquids), or it is possible to eject inks of a plurality of colors from a single recording head.

Furthermore, the present invention is not limited to a full line head, and may also be applied to a serial (shuttle) scanning type recording head (a recording head which ejects droplets while moving reciprocally in a direction substantially perpendicular to the conveyance direction of the recording medium).

Preferably, the correction conditions are conditions where differential coefficients at a frequency origin point (f=0) in the power spectrum representing the spatial frequency characteristics of the density non-uniformity become substantially zero.

According to this aspect of the present invention, since the density correction coefficients are specified by using conditions under which the differential coefficients at the frequency origin point (f=0) of the power spectrum after correction using the density correction coefficients become substantially zero, then the intensity of the power spectrum becomes a minimum at the frequency origin point and the power spectrum restricted to a low value in the vicinity of the origin (in other words, in the low-frequency region). Accordingly, highly accurate correction of non-uniformity can be achieved.

Preferably, the correction conditions are expressed by N simultaneous equations obtained according to conditions for preserving a DC component of the spatial frequency, and conditions at which the differential coefficients up to (N−1)-th order become substantially zero.

If the density correction coefficients are determined respectively for the N correction recording elements, then since there are N unknown numbers, N simultaneous equations are obtained by using conditions for preserving the DC component and conditions whereby the differential coefficients up to the (N−1)-th order become substantially zero. By solving these equations, it is possible to specify all of the unknown numbers.

Furthermore, by satisfying conditions whereby the higher order differential coefficients become substantially zero, the degree of increase in the power spectrum is further restricted with respect to increase in the frequency from the origin point of the frequency range, and the intensity of the low-frequency component is kept to a lower value.

Preferably, the recording characteristics include recording position error.

According to this aspect of the present invention, it is possible to achieve effective correction of density non-uniformities arising from depositing position error.

Preferably, the density correction coefficients for the recording elements are specified by the following equation:

$$d_i = \begin{cases} \dfrac{\prod_k x_k}{x_i \cdot \prod_{k \neq i}(x_k - x_i)} - 1 & \text{(for the correction object recording element)} \\[2ex] \dfrac{\prod_k x_k}{x_i \cdot \prod_{k \neq i}(x_k - x_i)} & \text{(for the recording elements other than the correction object recording element),} \end{cases}$$

where i is an index identifying a position of the recording element, $d_i$ is the density correction coefficient for the recording element i, and $x_i$ is a recording position of the recording element i.

Looking in particular at the center of gravity position of the density profile, it is possible to obtain an equation for calculating the density correction coefficient by means of arithmetical processing using a δ function type of print model, which approximates the profile to a δ function. The application of the present invention to an actual apparatus is not limited to a mode where the precise solution provided by the above-described equation is used directly, and it is also possible to revise the value to a practicable value, by applying suitable correction to the precise solution.

Preferably, i and k are indexes identifying the recording elements; in relation to the recording position error of the recording element k, the density correction coefficients are determined for the N recording elements including the recording element k and the recording elements surrounding the recording element k; d(i, k) is the density correction coefficient for the recording element i in relation to the recording position error of the recording element k; and a total density correction coefficient $d_i$ for the recording element i is obtained by linear combination of d(i, k) taking the index k as a variable.

At any particular recording element i, density correction coefficients are determined respectively and independently with respect to the recording position errors of a plurality of recording elements, and the total density correction coefficient of that recording element i is determined by superimposition (linear combination) of the independently calculated density correction coefficients.

In this case, it is possible to take the depositing position error of all of the recording elements (all of the k values) as objects for correction and to determine the linear combination of all of the d(i, k) values accordingly, or it is also possible to determine the linear combination of the d(i, k) values relating to a portion of the index k values selected on the basis of certain conditions, for instance, by setting only those recording elements having a depositing position error exceeding a prescribed threshold value as objects for correction, or the like.

Preferably, a lower limit d_min and an upper limit d_max are designated for a value of the total density correction coefficient $d_i$; and a value of N is set in such a manner that a relationship of d_min<$d_i$<d_max is satisfied.

The accuracy of correction tends to increase as the value of N rises, but the breadth of change of the density correction coefficients also increases with increase in the value of N and hence setting an excessively high value for N may cause disruption of the reproduced image. From this viewpoint, a desirable mode is one in which a limit range (upper limit and lower limit) is set for the density correction coefficients, and a suitable N value is set in such a manner that the total density correction coefficient comes within this limit range.

Preferably, the image recording apparatus further comprises: a storage device which stores a print model of the recording elements, wherein the correction coefficient specification device specifies the density correction coefficients according to the print model.

The print model represents the density profile printed by the recording element. The δ function model described above has, for example the advantage of enabling easy arithmetic handling. Furthermore, if a general print model (general model) is used which reflects the density profile while taking account of the spreading of the dots during actual printing, then the correction effect is even greater than in the case of a δ function model.

Preferably, the storage device stores a plurality of print models of the recording elements; and the image recording apparatus further comprises a print model changing device which selects one of the print models according to a recording state of the recording elements.

If there is a change in the type of recording medium or the droplet size (ejected droplet volume), or the like, then the recording state, such as the dot diameter (depositing diameter), changes in accordance with these conditions. Therefore, a desirable mode is one in which the print model is selected on the basis of the recording state. Accordingly, it is possible further to enhance the correction effect.

Preferably, the print model includes a hemispherical model.

A hemispherical mode which approximates the density profile printed by a recording element to a hemisphere is useful as a model which is close the shape of an actual dot and which allows analytical calculation.

In order to attain the aforementioned object, the present invention is also directed to an image recording method for recording an image on a recording medium by a plurality of recording elements of a recording head while causing the recording head and the recording medium to move relatively to each other by conveying at least one of the recording head and the recording medium, the method comprising: a characteristics information acquisition step of acquiring information that indicates recording characteristics of the recording elements; a correction object recording element specification step of specifying a correction object recording element from among the plurality of recording elements, a density non-uniformity caused by the recording characteristic of the correction object recording element being corrected; a correction range setting step of setting N correction recording elements (where N is an integer larger than 1) from among the plurality of recording elements, the N correction recording elements being used in correction of output density; a correction coefficient specification step of calculating the density non-uniformity caused by the recording characteristic of the correction object recording element, and specifying density correction coefficients for the N correction recording elements according to correction conditions that reduce a low-frequency component of a power spectrum representing spatial frequency characteristics of the calculated density non-uniformity; a correction processing step of performing calculation for correcting the output density by using the density correction coefficients specified in the correction coefficient specification step; and a drive control step of controlling driving of the recording elements according to correction results produced in the correction processing step.

In order to attain the aforementioned object, the present invention is also directed to a method of specifying density correction coefficients, comprising: a characteristics information acquisition step of acquiring information that indicates recording characteristics of a plurality of recording elements of a recording head; a correction object recording element specification step of specifying a correction object recording element from among the plurality of recording elements, a density non-uniformity caused by the recording characteristic of the correction object recording element being corrected; a correction range setting step of setting N correction recording elements (where N is an integer larger than 1) from among the plurality of recording elements, the N correction recording elements being used in correction of output density; and a correction coefficient specification step of calculating the density non-uniformity caused by the recording characteristic of the correction object recording element, and specifying density correction coefficients for the N correction recording elements according to correction conditions that reduce a low-frequency component of a power spectrum representing spatial frequency characteristics of the calculated density non-uniformity.

Furthermore, it is also possible to provide an image processing method which comprises a correction processing step of performing a calculation for correcting the output density by using density correction coefficients specified by the method of specifying density correction coefficients. Of course, it is also possible to provide a program for causing a computer to implement the respective steps of the method for specifying density correction coefficients, and an image processing method incorporating a correction processing step. The program according to the present invention may be used as an operating program of a central processing unit (CPU) incorporated into a printer, and it may also be used in a computer system, such as a personal computer.

Furthermore, the program may be constituted by stand-alone applicational software, or it may be incorporated as a part of another application, such as image editing software. This program can be stored in a CD-ROM, a magnetic disk, or other information storage medium (an external storage device), and the program may be provided to a third party by means of such an information storage medium, or a download service for the program may be offered by means of a communications circuit, such as the Internet.

According to the present invention, it is possible to correct density non-uniformities caused by variation in the recording characteristics of recording elements, with high accuracy, and hence images of high quality can be formed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Correction Principles

Firstly, the principles of correction are hereby described. In the correction processing for density non-uniformities according to an embodiment of the present invention described here, when correcting the depositing position error of a particular nozzle, correction is performed by using N pieces of nozzles including the particular nozzle and the nozzles surrounding the particular nozzle. As described in detail below, the greater the number of nozzles N used for correction, the greater the correction accuracy.

Figure 1:
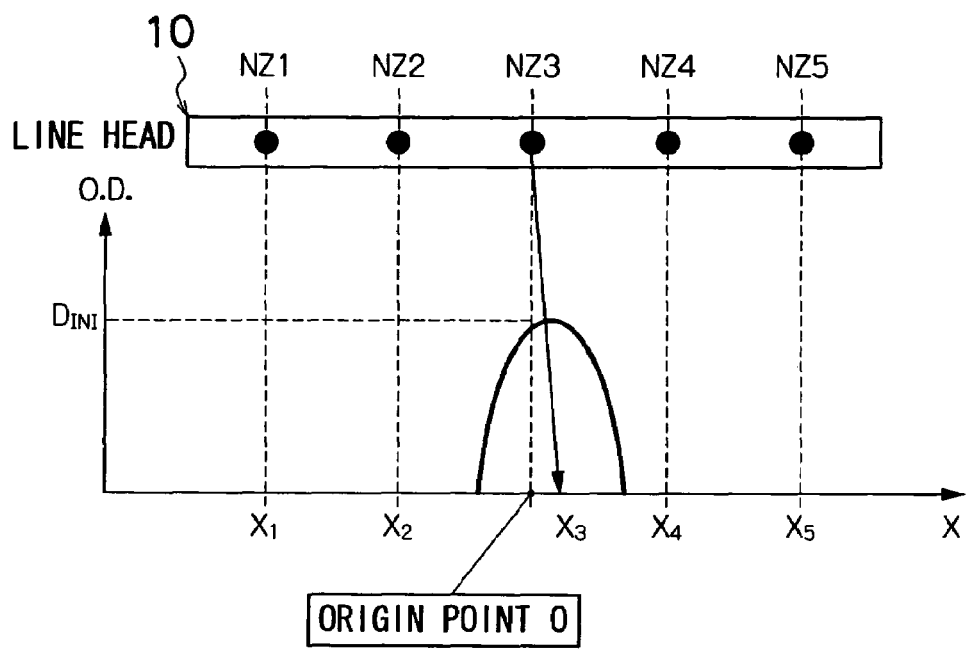
FIG. 1 is an illustrative diagram showing an embodiment of a density profile before correction of density non-uniformity according to the present embodiment.
Figure 16:
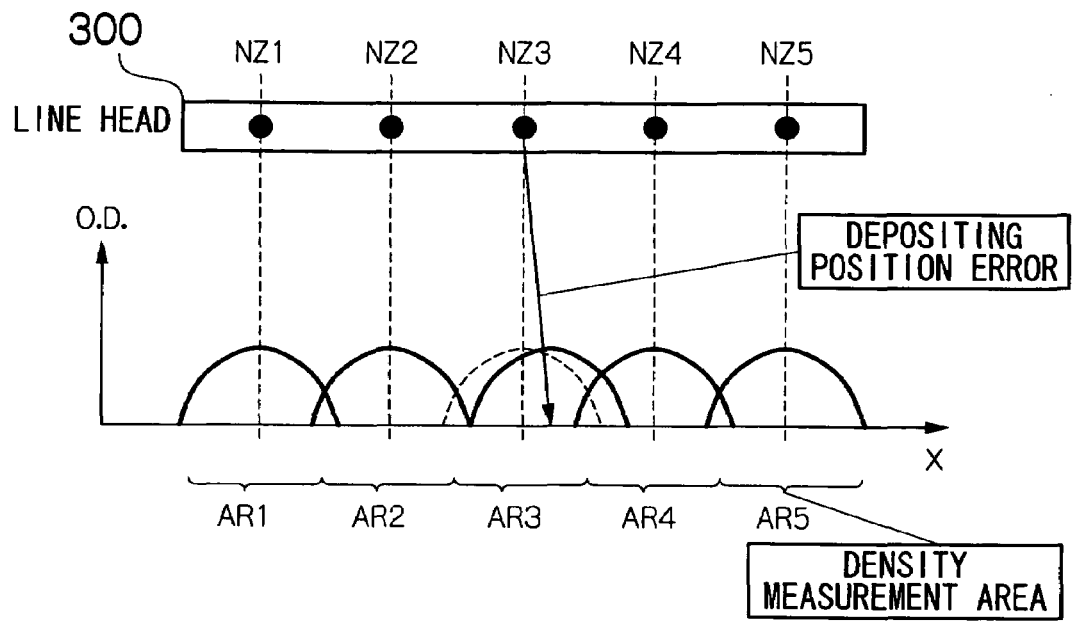
FIG. 16 is an illustrative diagram of a correction method in the related art.
Figure 17:
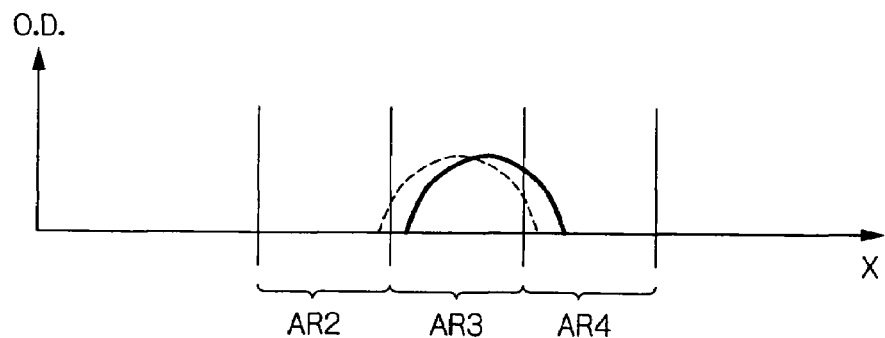
FIG. 17 is an illustrative diagram showing an embodiment of the specification of weightings according to a correction method in the related art.

FIG. 1 is a diagram of a mode before correction. In FIG. 1, similarly to FIG. 16, the third nozzle (NZ3) from the left in a line head 10 (which is equivalent to a recording head) has a depositing position error, and hence the depositing position is displaced from the ideal depositing position (the origin O) in the rightward direction in the diagram (the main scanning direction indicated by the X axis). Furthermore, the graph shown in the bottom part of FIG. 1 indicates the density profile of the nozzle column direction (main scanning direction), obtained by averaging the print density produced by the droplets ejected from each nozzle in the conveyance direction of the recording medium (the sub-scanning direction). Here, since correction relating to the printing by the nozzle NZ3 is considered in FIG. 1, the density outputs of the nozzles other than the nozzle NZ3 are not shown in FIG. 1.

The initial output density of each of the nozzles NZ1 to NZ5 is $D_i = D_{INI}$ (where i is the nozzle number of 1, 2, 3, 4 or 5, and $D_{INI}$ is a uniform value), the origin O is set at the ideal depositing position of the nozzle NZ3, and the depositing position of each of the nozzles NZ1 to NZ5 is $X_i$.

Here, $D_i$ represents the output optical density of the nozzle when averaged physically in the recording medium conveyance direction, and corresponds to the average of the density data $D(i, j)$ of pixels (where i is the nozzle number, and j is the pixel number in the conveyance direction of the recording medium) taken with respect to "j" in the data processing.

As shown in FIG. 1, the depositing position error of the nozzle NZ3 is represented by the divergence from the origin point O of the density output of the nozzle NZ3 (thick line). Here, the correction of this divergence in the output density is considered.

Figure 2:
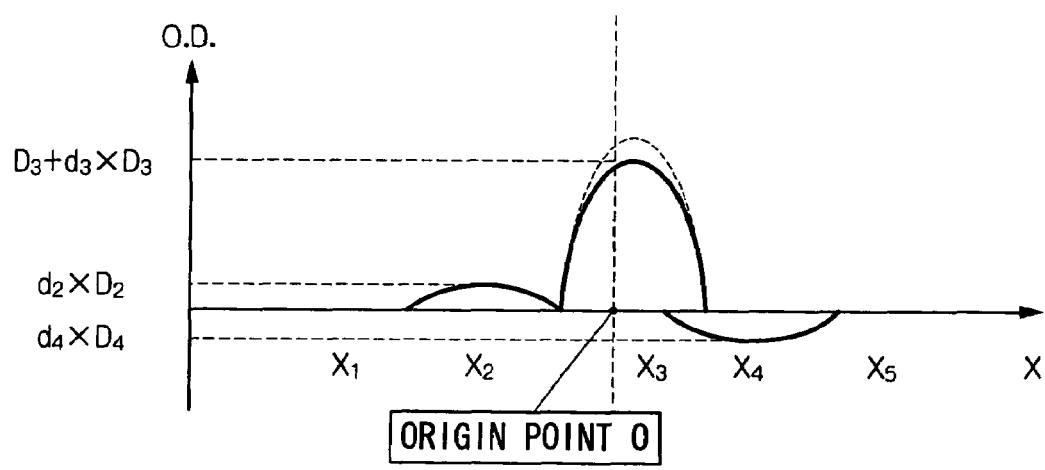
FIG. 2 is an illustrative diagram showing a state after correction of density non-uniformity according to the present embodiment.

FIG. 2 is a diagram of a mode after correction. Here, only the correction components are shown for the nozzles other than the nozzle NZ3. In the case of FIG. 2, the number of nozzles used in correction is N=3, and density correction coefficients d2, d3 and d4 are applied to the nozzles NZ2, NZ3 and NZ4, respectively. The density correction coefficients $d_i$ described here are defined as $D'_i = D_i + d_i \times D_i$, where $D'_i$ are the output densities after correction.

In the present embodiment, the density correction coefficient $d_i$ of each nozzle is specified so as to minimize the visibility of the density non-uniformity. Density non-uniformities in the print image are represented by the intensities in the spatial frequency characteristics (power spectrum). Since the characteristics of human vision mean that high-frequency components are not readily visible, the visibility of a density non-uniformity corresponds to the low-frequency component of the power spectrum. In this case, the density correction coefficient $d_i$ for each nozzle is specified so as to minimize the low-frequency component of the power spectrum.

The details of the derivation of the equation for specifying the density correction coefficient $d_i$ are described later, but to state the result in advance, the density correction coefficient $d_i$ corresponding to the depositing position error of a particular nozzle (correction object nozzle) is specified by means of the following equation:

$$d_i = \begin{cases} \dfrac{\prod_k x_k}{x_i \cdot \prod_{k \ne i}(x_k - x_i)} - 1 & \text{(for the correction object nozzle)} \\[1em] \dfrac{\prod_k x_k}{x_i \cdot \prod_{k \ne i}(x_k - x_i)} & \text{(for nozzles other than the correction object nozzle),} \end{cases} \quad (1)$$

where $x_i$ is the depositing position of each nozzle, taking the origin at the ideal depositing position of the correction object nozzle; and $\Pi$ means that the product is found for the N nozzles used for correction. When stated explicitly for the case of N=3 in FIG. 2, the following equations are derived:

$$d_2 = \frac{x_2 \cdot x_3 \cdot x_4}{x_2 \cdot (x_3 - x_2) \cdot (x_4 - x_2)}; \quad (2)$$

$$d_3 = \frac{x_2 \cdot x_3 \cdot x_4}{x_3 \cdot (x_2 - x_3) \cdot (x_4 - x_3)} - 1; \text{ and} \quad (3)$$

$$d_4 = \frac{x_2 \cdot x_3 \cdot x_4}{x_4 \cdot (x_2 - x_4) \cdot (x_3 - x_4)}. \quad (4)$$

Calculation of Density Correction Coefficients

It is possible to logically derive the density correction coefficient for each nozzle from the conditions for minimizing the low-frequency component of the power spectrum of the density non-uniformity.

Firstly, a density profile $D(x)$ incorporating the error characteristics of each nozzle is defined as:

$$D(x) = \sum_i D_i \cdot z(x - x_i), \quad (5)$$

where i is the nozzle number, x is the positional coordinate on the medium (in the nozzle column direction), $D_i$ is the nozzle output density (the height of peak), z(x) is the standard density profile (where x=0 is the center of gravity), and $x_i = \bar{x}_i + \Delta x_i$ is the depositing position of the i-th nozzle (the ideal position+the error).

The density profile D(x) of the image is the sum of the density profiles printed by the nozzles, and the print model represents the printing performed by each nozzle (the density profile printed by each nozzle). The print model is represented separately by the nozzle output density $D_i$ and the standard density profile z(x).

The standard density profile z(x) has a limited spread equal to the dot diameter in strict terms, but if the correction of positional errors is considered to be a problem of balancing divergences in the density, then the important element is the central position (depositing position) of the density profile and the spread of the density profile is a secondary factor. Hence, an approximation that converts the profile by means of a δ function is appropriate. When a standard density profile represented with a δ function is supposed, then an arithmetical treatment can be achieved readily, and a precise solution for the correction coefficients can be obtained.

Figure 3:
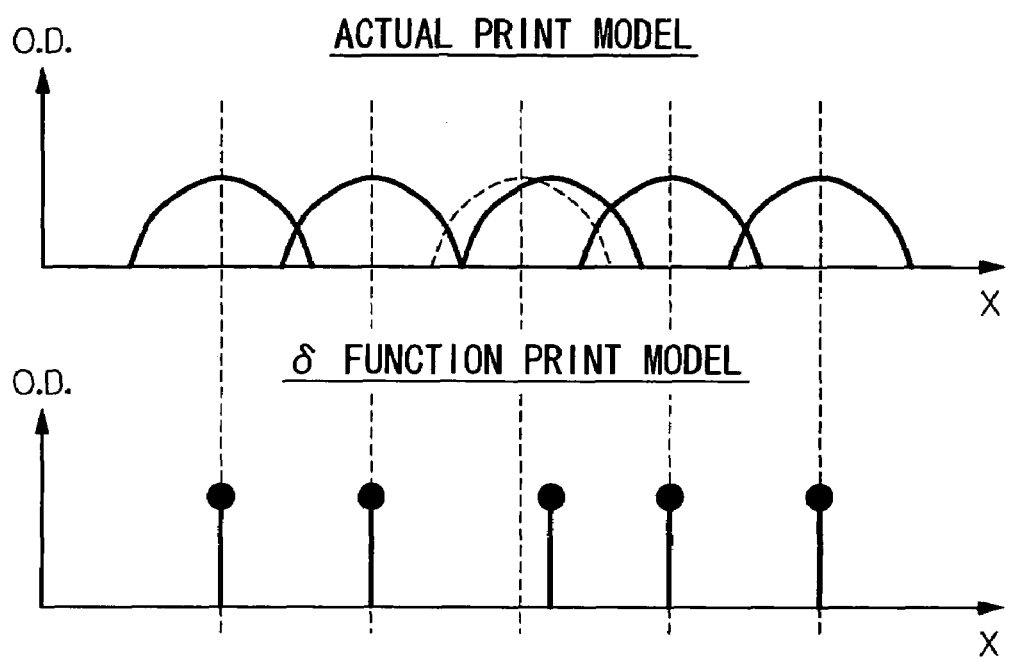
FIG. 3 is a graph of density profiles of an actual print model and a δ function type of print model.

FIG. 3 shows a graph of density profiles of an actual print model and a δ function type of print model. The standard density profile is represented as approximation using the δ function model as:

$$z(x-x_i) = \delta(x-x_i). \quad (6)$$

In calculating the correction coefficients, it is considered that the depositing position error $\Delta x_0$ of a particular nozzle (i=0) is to be corrected by means of the N pieces of nozzles including the particular nozzle and the nozzles surrounding the particular nozzle. Here, the number of the nozzle to be corrected is i=0. Attention is paid to the fact that each of the surrounding nozzles may also have a prescribed depositing position error.

The numbers (indexes) of the N nozzles including the nozzle to be corrected (central nozzle) are represented as:

$$\text{Nozzle index: } i = -\frac{N-1}{2}, \ldots, -1, 0, 1, \ldots, \frac{N-1}{2}. \quad (7)$$

The number N must be an odd number in this expression, but in implementing the present invention, the number N is not necessarily limited to being an odd number.

The initial output density (the output density before correction) has a value only if i=0, and is represented as follows:

$$D_i = \begin{cases} D_{INI} & (i = 0) \\ 0 & (i \neq 0). \end{cases} \quad (8)$$

When the density correction coefficients are $d_i$, then the output densities $D'_i$ after correction are represented as follows:

$$D'_i = D_i + d_i \times D_{INI} = d'_i \times D_{INI}, \quad (9)$$

where $$d'_i = \begin{cases} d_i + 1 & (i = 0) \\ d_i & (i \neq 0). \end{cases}$$

In other words, when i=0, the corrected output density is the sum of the initial output density value and the correction value ($d_i \times D_{INI}$), and when i≠0, the corrected output density is equal to the correction value only.

The depositing position $x_i$ of each nozzle i is represented as:

$$x_i = \bar{x}_i + \Delta x_i \quad (10)$$

where $\bar{x}_i$ is the ideal depositing position, $\Delta x_i$ is the depositing position error, and the ideal depositing position of the correction object nozzle is set as the origin ($\bar{x}_0 = 0$).

When using a δ function type of print model, the density profile after correction is expressed as follows:

$$D(x) = \sum_{i=-(N-1)/2}^{i=(N-1)/2} D'_i \cdot \delta(x - x_i) = D_{INI} \cdot \sum_{i=-(N-1)/2}^{i=(N-1)/2} d'_i \cdot \delta(x - x_i). \quad (11)$$

By Fourier transform on this equation, the following equation is obtained:

$$T(f) = \quad (12)$$
$$\int_{-\infty}^{\infty} D(x) \cdot e^{ifx} dx = \sum_i d'_i \cdot \int_{-\infty}^{\infty} \delta(x - x_i) \cdot e^{ifx} dx = \sum_i d'_i \cdot e^{ifx_i},$$

where $D_{INI}$ is omitted since it is a common constant.

Minimizing the visibility of density non-uniformities means minimizing the low-frequency components of the power spectrum expressed as:

$$\text{Power spectrum} = \int T(f)^2 df. \quad (13)$$

This can be approximated arithmetically by taking the differential coefficients (of the first-order, the second-order, ...) for f=0 in T(f) to be zero. Since there are N unknown numbers $d'_i$, then if conditions are used where the differential coefficients up to the (N-1)-th order are zero, and also including the condition for maintaining the direct current (DC) component, then all (N) of the unknown numbers $d'_i$ can be specified precisely. Thus, the following correction conditions are specified:

DC component: $T(f = 0) = 1$ (14)

(condition for preserving the DC component);

First-order coefficient $\frac{d}{df} T(f = 0) = 0;$ (15)

Second-order coefficient $\frac{d^2}{df^2} T(f = 0) = 0;$ (16)

...

-continued $$(N-1)\text{-th order coefficient } \frac{d^{N-1}}{df^{N-1}}T(f=0)=0. \tag{17}$$

In the δ function model, when the correction conditions are developed, N simultaneous equations relating to Di are reached by means of a simple calculation. When the correction conditions are rearranged, the following group of conditions (group of equations) is obtained:

$$\sum d_i' = 1; \tag{18}$$

$$\sum x_i d_i' = 0; \tag{19}$$

$$\sum x_i^2 d_i' = 0; \tag{20}$$

...

$$\sum x_i^{N-1} d_i' = 0. \tag{21}$$

The meaning of this group of equations is that the first equation represents the preservation of the DC component and the second equation represents the preservation of the central position. The third and subsequent equations represent the fact that the (N−1)-th moment in the statistical calculation is zero.

The conditional equations thus obtained can be represented with a matrix format as follows:

$$\begin{pmatrix} 1 & \cdots & 1 & \cdots & \cdots & 1 \\ x_{-(N-1)/2} & \cdots & x_0 & \cdots & & x_{(N-1)/2} \\ x_{-(N-1)/2}^2 & \cdots & x_0^2 & & \cdots & x_{(N-1)/2}^2 \\ \vdots & & & \ddots & & \vdots \\ \vdots & & & & \ddots & \vdots \\ x_{-(N-1)/2}^{N-1} & \cdots & x_0^{N-1} & \cdots & \cdots & x_{(N-1)/2}^{N-1} \end{pmatrix} \begin{pmatrix} d'_{-(N-1)/2} \\ \vdots \\ \vdots \\ d'_0 \\ \vdots \\ \vdots \\ d'_{(N-1)/2} \end{pmatrix} = \begin{pmatrix} 1 \\ 0 \\ \vdots \\ 0 \\ \vdots \\ 0 \end{pmatrix}. \tag{22}$$

This coefficient matrix A is a so-called Vandermonde matrix, and it is known that this matrix equation can be converted to the following equation, by using the product of the differences:

$$|A| = \prod_{j>k}(x_j - x_k). \tag{23}$$

It is hence possible to determine the precise solution of $d'_i$ using the Crammer's formula. The detailed sequence of the calculation is omitted here, but by means of algebraic calculation, the following solution is obtained:

$$d_i' = \frac{\prod_k x_k}{x_i \cdot \prod_{k \neq i}(x_k - x_i)}. \tag{24}$$

Therefore, the correction coefficients $d_i$ are determined as follows:

$$d_i = \begin{cases} \dfrac{\prod_k x_k}{x_i \cdot \prod_{k \neq i}(x_k - x_i)} - 1 & (i=0) \\[2ex] \dfrac{\prod_k x_k}{x_i \cdot \prod_{k \neq i}(x_k - x_i)} & (i \neq 0). \end{cases} \tag{25}$$

Thus, the precise solution for the density correction coefficients $d_i$ is found, from the conditions where the differential coefficients at the origin of the power spectrum become zero. As the number of nozzles N used in the correction increases, the possibility of making the higher-order differential coefficients become zero increases, and hence, the low-frequency energy becomes smaller and the visibility of non-uniformities is reduced yet further.

In the present embodiment, the conditions where the differential coefficients at the origin become zero are used, but if the differential coefficients become sufficiently small values compared to the differential coefficients before the correction (such as 1/10 of the values before the correction), rather than being set completely to zero, it is still possible to make the low-frequency components of the power spectrum of the density non-uniformity sufficiently small. In other words, from the viewpoint of achieving conditions where the low-frequency components of the power spectrum are reduced to extent by which density non-uniformities become invisible, it is acceptable that the differential coefficients of the power spectrum at the origin are set to sufficiently small values (approximately 0), and that the range of each differential coefficient after correction can be set up to 1/10 of the absolute value of the differential coefficient before correction.

Results of Correction using the Above-Described Density Correction Coefficients

Figure 4:
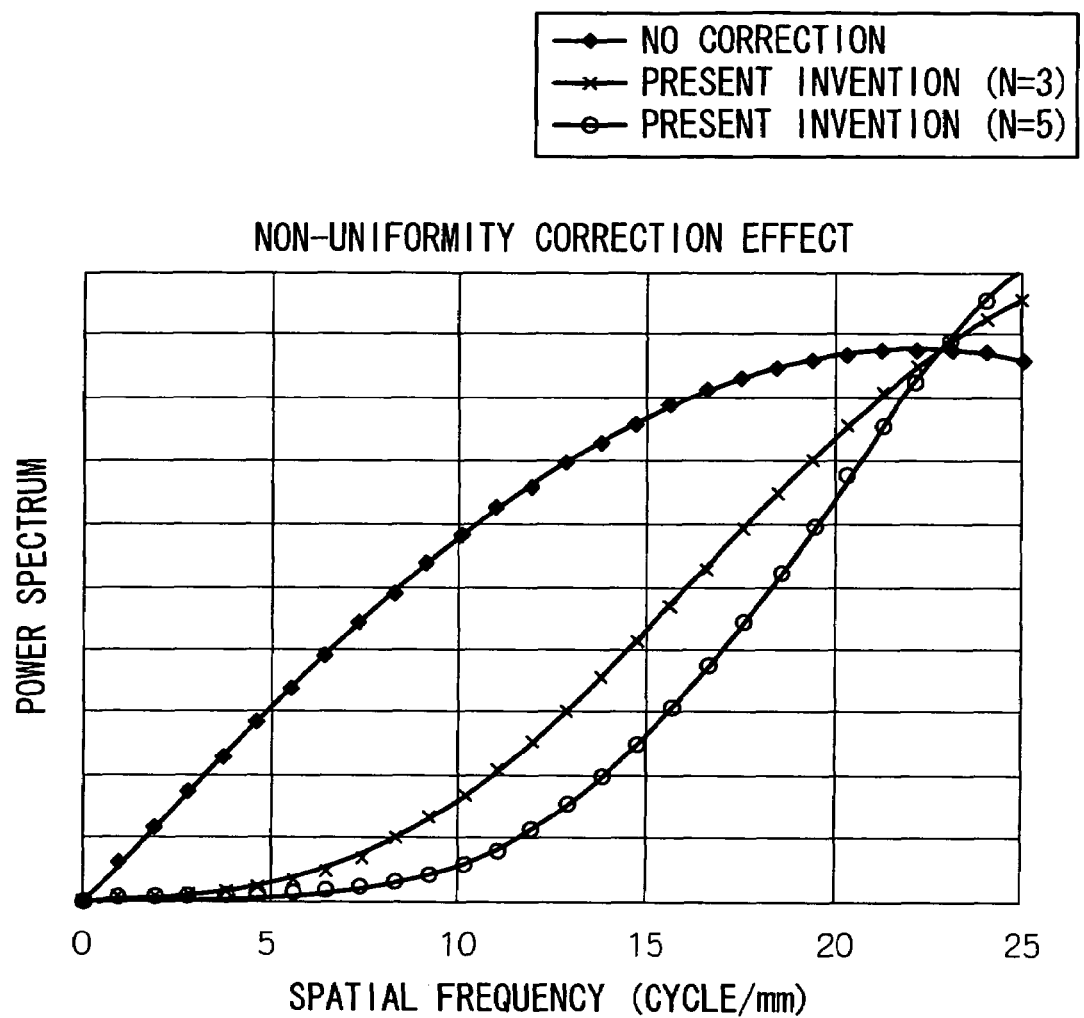
FIG. 4 is a graph of a power spectrum showing the results of correction according to the present embodiment.

FIG. 4 shows the spatial frequency characteristics (power spectra) after correction for a nozzle having the depositing position error shown in FIG. 1. FIG. 4 shows an example of the correction when N=3 according to the embodiment of the present invention; and an example of the correction when N=5 according to the embodiment of the present invention. The common conditions used in the calculations are that: the dot density is 1200 dots per inch (dpi); the diameter of the deposited dot is 32 μm; and the nozzle position error (depositing position error) is 10 μm.

If the human visual characteristics are taken into account, then the visibility of the density non-uniformity is represented by the power spectrum in the low-frequency region of the spatial frequency of 0 cycle/mm to 8 cycle/mm, and the smaller the power spectrum in this region, the greater the correction accuracy.

The correction example 1 (N=3) according to the embodiment of the present invention shows a case where the power spectrum is substantially zero in the region of 0 cycle/mm to 5 cycle/mm, and a suitable correction effect is obtained in comparison with a case where there is no correction. Furthermore, in the correction example 2 (N=5) according to the embodiment of the present invention, the power spectrum is further reduced in comparison with the correction example 1 (N=3). Therefore, the greater the number of nozzles N used in correction, the greater the improvement in the correction effect. In the case of FIG. 1, although the output density of the nozzle NZ3 to be corrected does not project physically into AR1 and AR5 (see FIG. 16), it is possible further to reduce the power spectrum by using the nozzles NZ1 and NZ5 for correction as well.

Figure 5:
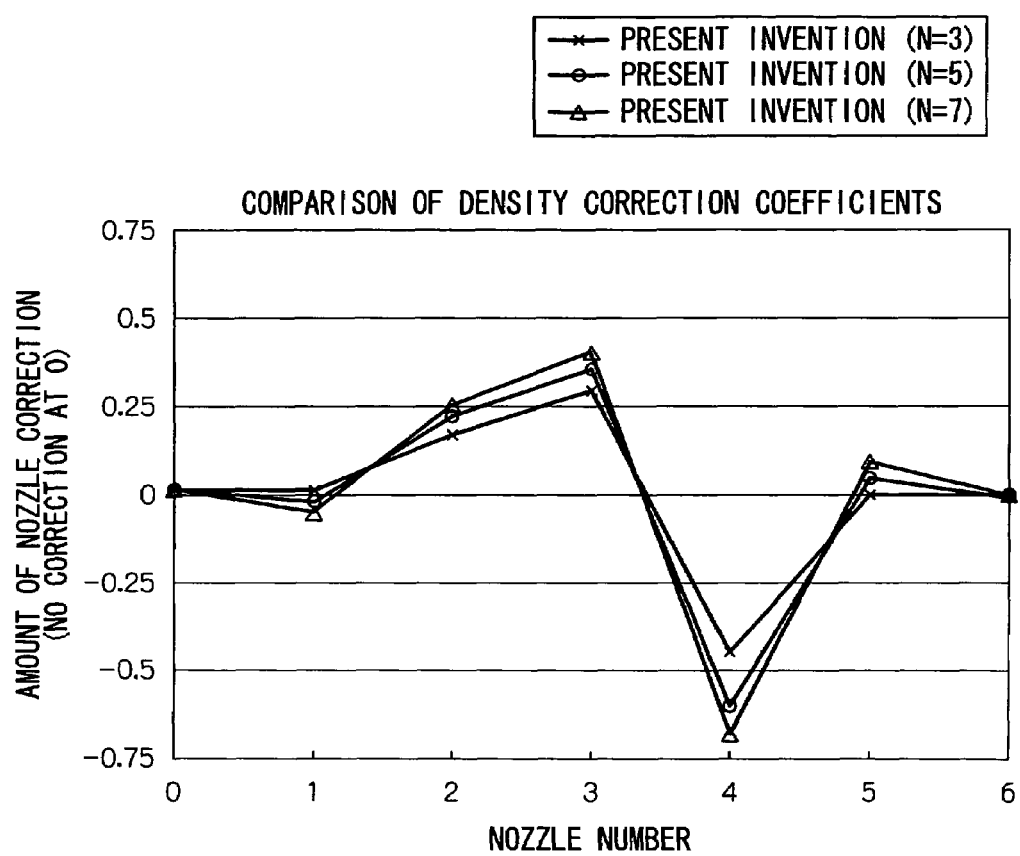
FIG. 5 is a graph used to describe the relationship between the number of nozzles (N) used for correction, and the density correction coefficients.

FIG. 5 shows a comparison of the density correction coefficients of the correction examples 1 to 3 for different numbers of nozzles used in correction. The correction accuracy improves as the value of N increases, as revealed by a comparison between the correction example 1 when N=3 according to the embodiment of the present invention, the correction example 2 when N=5 according to the embodiment of the present invention, and the correction example 3 when N=7 according to the embodiment of the present invention, but the range of the change in the density correction coefficients also increases. Furthermore, naturally, as the depositing position error of the nozzles increases, the range of the change in the density correction coefficients also increases.

If the density correction coefficient increases over a certain value, then this is undesirable since there is a possibility that the reproducibility of the input image is disrupted. Therefore, a greater than necessary increase in the N value is not desirable. Desirably, an optimal N value is set by taking account of both correction accuracy and image reproducibility. In the case of each of the correction examples 1 to 3 for N=3 to 7 shown in FIG. 5, the (absolute value of the) amount of change in the density correction coefficient is relatively small, and therefore density non-uniformities can be corrected without disrupting the reproduction of the input image.

The foregoing description relates to the method of specifying density correction coefficients relating to one particular nozzle (e.g., the nozzle NZ3 in FIG. 1). In actual practice, all of the nozzles in the head have some degree of depositing position errors, and therefore it is desirable that corrections are performed in respect of all of these depositing position errors.

In other words, the aforementioned density correction coefficients for the surrounding N nozzles are determined with respect to every nozzle. Since the equations for minimizing the power spectra, which are described later and used when specifying the density correction coefficients, are linear, then it is possible to superpose the equations for each nozzle. Therefore, the total density correction coefficient for a nozzle is determined by finding the sum of the density correction coefficients obtained as described above.

More specifically, if the density correction coefficient for a nozzle i in relation to the positional error of a nozzle k is set to be d(i, k), then the value of this d(i, k) is determined by the above-described equation (1), and the total density correction coefficient $d_i$ for the nozzle i is obtained by linear combination of d(i, k) as follows:

$$d_i = \sum_k d(i, k). \tag{26}$$

In this embodiment, d(i, k) are accumulated for the index k assuming that the depositing position errors of all of the nozzles are to be corrected, but it is also possible to adopt a composition in which a certain value ΔX_thresh is set previously as a threshold value, and correction is performed selectively by setting as objects for correction only those nozzles that have a depositing position error exceeding this threshold value.

As stated above, the accuracy of correction is improved if the value of the number of nozzles N used for the correction is increased, but this also increases the breadth of change of the density correction coefficients and may lead to disruption of the reproduced image. Therefore, desirably, a limit range (a lower limit d_min to an upper limit d_max) is set for the correction coefficients in order to prevent the occurrence of image disruption, and the value N is set in such a manner that the total density correction coefficient determined by the above-described equation (26) comes within this limit range. In other words, the value N is set in such a manner that the relationship of d_min<$d_i$<d_max is satisfied.

From experimental observation, it is known that image disruption does not occur provided that d_min≧−1 and d_max≦1.

Image Processing Sequence

Figure 6:
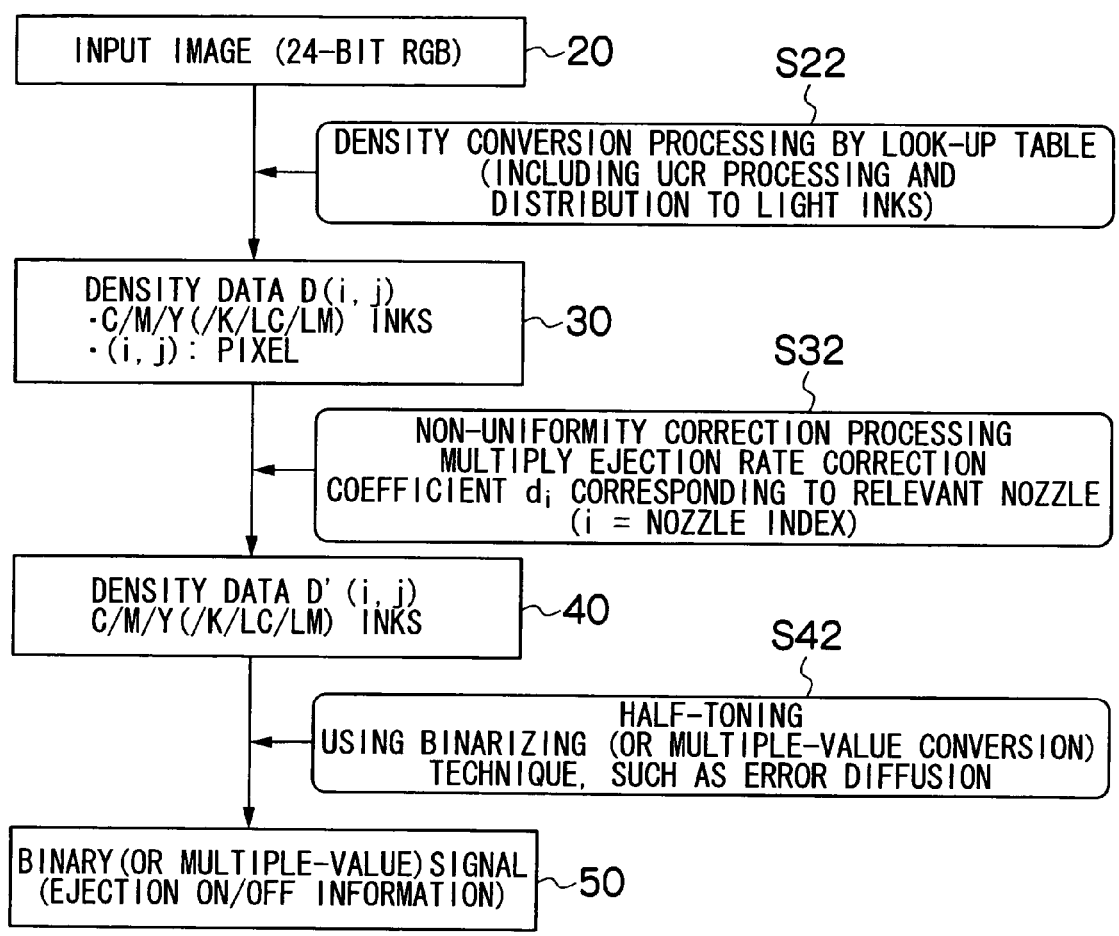
FIG. 6 is a flowchart showing the sequence of image processing according to the present embodiment.

An image processing sequence which incorporates the non-uniformity correction processing according to the present embodiment is shown in FIG. 6.

For example, the input image 20 of 24-bit RGB data is inputted, but there are no particular restrictions on the data format of the input image 20. Density conversion processing based on a look-up table is carried out on this input image 20 (step S22), thereby converting the input image into density data D(i, j) corresponding to the ink colors of the printers. Here, (i, j) indicates the position of a pixel, and hence the density data is assigned to each of pixels.

In this case, is it supposed that the image resolution of the input image 20 matches the image resolution (nozzle resolution) of the printer. If the image resolution of the input image does not match the image resolution (nozzle resolution) of the printer, then pixel number conversion processing is carried out on the input image, in accordance with the resolution of the printer.

The density conversion processing in step S22 uses a general process, which includes under color removal (UCR) processing, light ink distribution processing in the case of a system which uses light inks (light-colored inks of the same color), and so on.

For example, in the case of the printer having a three-ink composition comprising cyan (C), magenta (M) and yellow (Y), the image is converted into CMY density data D(i, j). Alternatively, in the case of the printer having a system which also uses other inks, such as black (K), light cyan (LC), and light magenta (LM) in addition to the three inks of CMY, then the image is converted into density data D(i, j) including these additional ink colors.

Non-uniformity correction processing is carried out with respect to the density data D(i, j) obtained by the density conversion processing (denoted with reference numeral 30 in FIG. 6) (step S32). Here, a calculation is performed in order to multiply the density correction coefficient (ejection rate correction coefficient) $d_i$ corresponding to the related nozzle, by the density data D(i, j).

Figure 7:
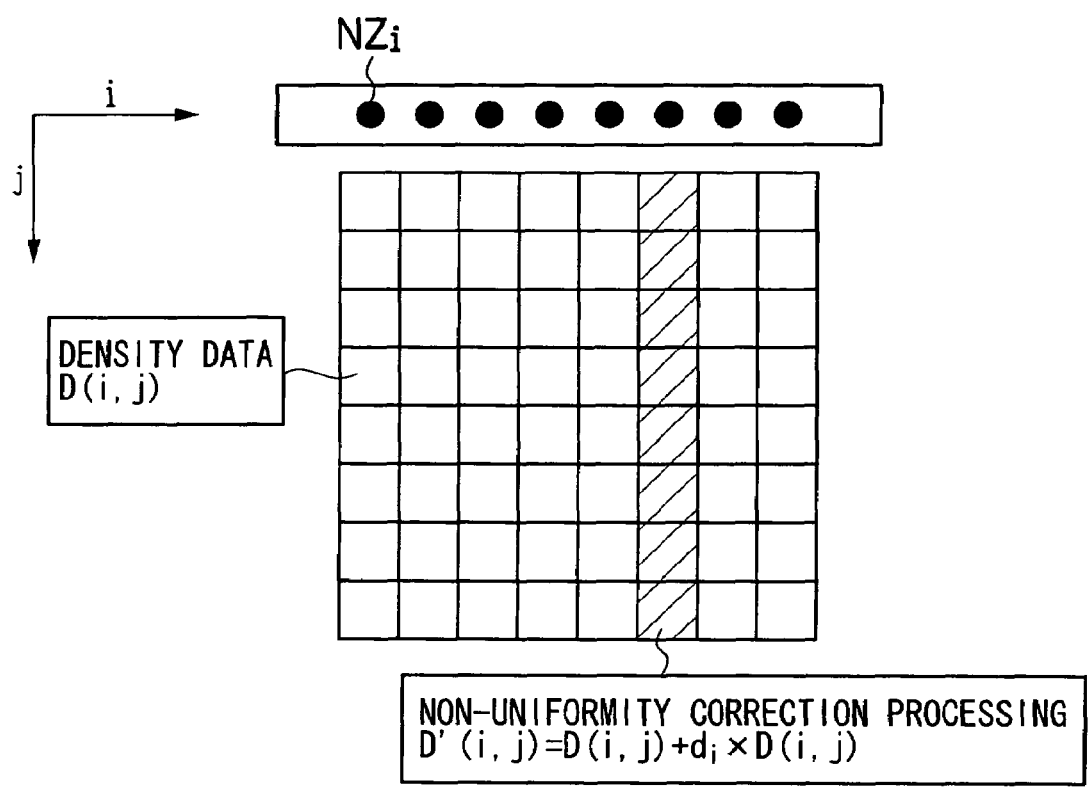
FIG. 7 is a conceptual diagram of density non-uniformity correction processing according to the present embodiment.

As shown in the schematic drawing in FIG. 7, the pixel position (i, j) on the image is specified by the position (main scanning direction position) i of the nozzle $NZ_i$, and a sub-scanning direction position j, and the density data D(i, j) is assigned to each of the pixels. If non-uniformity correction processing is carried out for the nozzle that ejects droplets to form the pixel column indicated by the shading in FIG. 7, then the density data D'(i, j) after correction can be calculated by the following equation:

$$D'(i, j) = D(i, j) + d_i \times D(i, j). \tag{27}$$

The corrected density data D'(i,j) is thus obtained.

By applying a half-toning process to the corrected density data D'(i, j) (denoted with reference numeral 40 in FIG. 6) (step S42), the data is converted into dot on/off signals (in binary data), or alternatively, if the dot sizes are variable, then the data is converted into multiple-value data signals including the size types (selection of dot size). There are no particular restrictions on the half-toning method used, and a commonly known binarizing (or multiple-value converting) technique, such as error diffusion, dithering, or the like, may be used.

Ink ejection (droplet ejection) data for each nozzle is generated on the basis of the binary (or multiple-value) signals thus obtained (denoted with reference numeral 50 in FIG. 6), and the ejection operation is controlled accordingly. Thus, density non-uniformities are suppressed and images of high quality can be formed.

Figure 8:
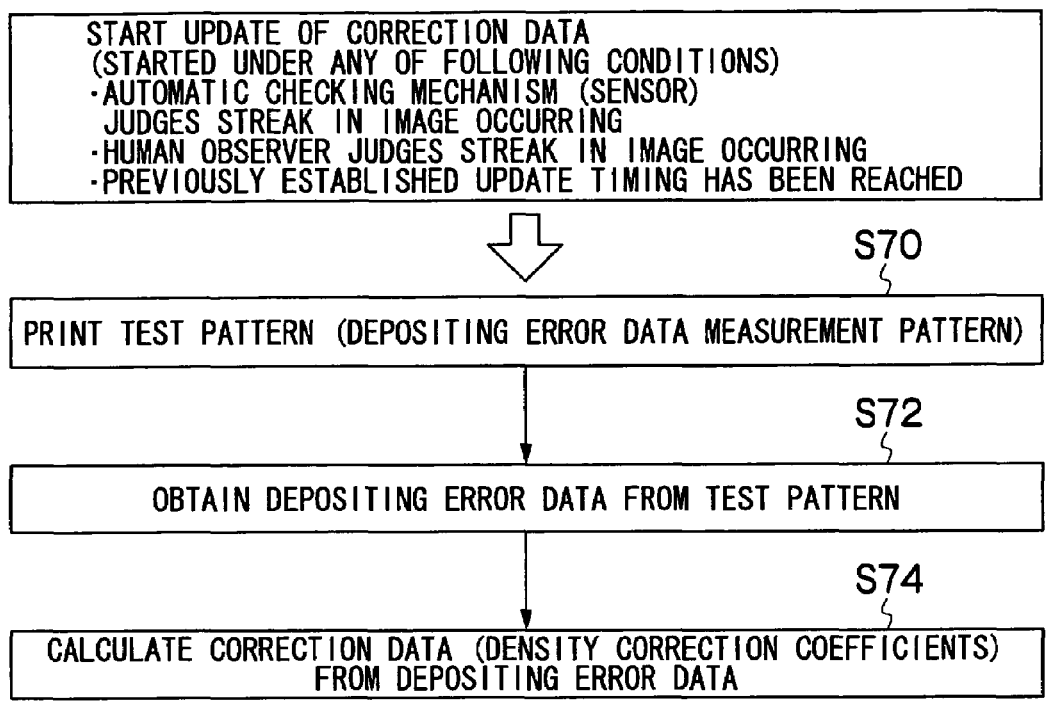
FIG. 8 is a flowchart showing a sequence of processing for updating the correction data.

FIG. 8 is a flowchart showing an embodiment of a process for updating the density correction coefficients (correction data). The correction data updating process starts when one of the following conditions applies, for instance.

Namely, the update processing shown in FIG. 8 starts if either: (a) an automatic checking device (sensor), which monitors the print result, judges that a non-uniformity streak has occurred in the printed image; or (b) a human observer judges that a non-uniformity streak has occurred in the printed image upon looking at the printed image, and performs a prescribed operation (such as inputting a command to start the updating process); or (c) a previously established update timing has been reached (the update timing can be set and judged by means of time management based on a timer, or the like, or operational record management based on a print counter).

When the update process starts, firstly, a test pattern for obtaining depositing error data (a prescribed pattern which is determined previously) is printed (step S70).

Next, the depositing error data is obtained on the basis of the print result of the test pattern (step S72). For this obtainment of the depositing error data, it is possible to use an image reading device having an image sensor (imaging elements) (including a signal processing device for processing the captured image signal). The depositing error data includes, for example, information on depositing position error, information on optical density information, and the like.

The correction data (density correction coefficients) is calculated from the depositing error data obtained at step S72 (step S74). The method of calculating the density correction coefficients is as described above.

The information relating to the density correction coefficients thus derived is stored in a rewriteable storage device, such as an EEPROM (electronically erasable and programmable read only memory), and subsequently, the most recent correction coefficients are used.

Composition of Inkjet Recording Apparatus

Next, an inkjet recording apparatus is described as a concrete embodiment of the application of an image recording apparatus having the density non-uniformity correction function described above.

Figure 9:
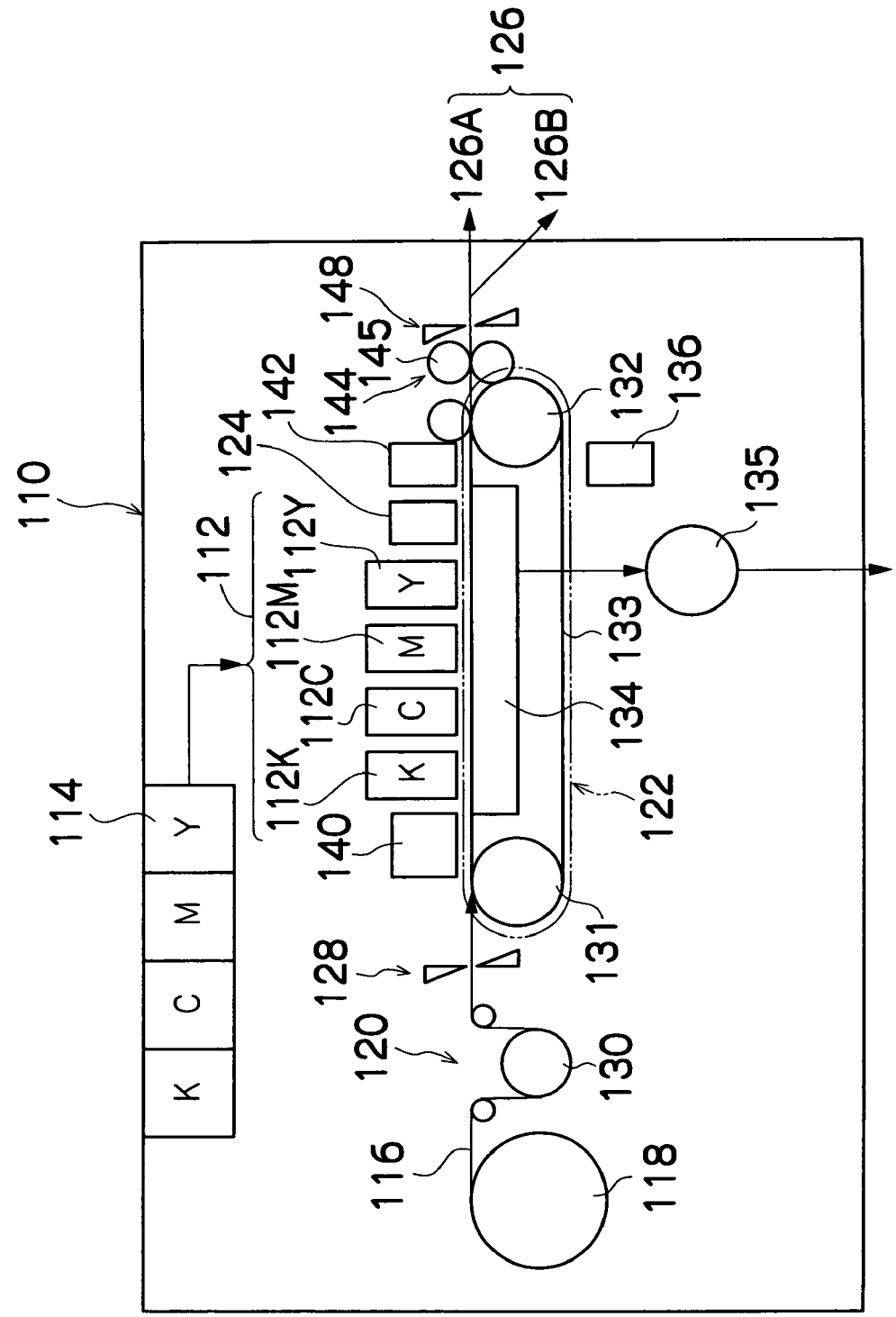
FIG. 9 is a general schematic drawing of an inkjet recording apparatus showing one embodiment of an image recording apparatus relating to the present invention.

FIG. 9 is a general schematic drawing of an inkjet recording apparatus 110, which forms one embodiment of an image recording apparatus according to the present invention. As shown in FIG. 9, the inkjet recording apparatus 110 comprises: a print unit 112 having a plurality of inkjet recording heads (hereinafter referred to as heads) 112K, 112C, 112M, and 112Y provided for ink colors of black (K), cyan (C), magenta (M), and yellow (Y), respectively; an ink storing and loading unit 114 for storing inks to be supplied to the heads 112K, 112C, 112M and 112Y; a paper supply unit 118 for supplying recording paper 116 forming a recording medium; a decurling unit 120 for removing curl in the recording paper 116; a belt conveyance unit 122, disposed facing the nozzle face (ink ejection face) of the print unit 112, for conveying the recording paper 116 while keeping the recording paper 116 flat; a print determination unit 124 for reading the printed result produced by the print unit 112; and a paper output unit 126 for outputting the recorded recording paper (printed matter) to the exterior.

The ink storing and loading unit 114 has ink tanks for storing the inks of K, C, M and Y to be supplied to the heads 112K, 112C, 112M, and 112Y, and the tanks are connected to the heads 112K, 112C, 112M, and 112Y by means of prescribed channels. The ink storing and loading unit 114 has a warning device (for example, a display device or an alarm sound generator) for warning when the remaining amount of any ink is low, and has a mechanism for preventing loading errors among the colors.

In FIG. 9, a magazine for rolled paper (continuous paper) is shown as an embodiment of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording media can be used, it is preferable that an information recording medium such as a bar code and a wireless tag containing information about the type of recording medium is attached to the magazine, and by reading the information contained in the information recording medium with a predetermined reading device, the type of recording medium to be used is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is preferably controlled so that the recording paper 116 has a curl in which the surface on which the print is to be made is slightly round outward.

In the case of the configuration in which roll paper is used, a cutter (first cutter) 128 is provided as shown in FIG. 9, and the continuous paper is cut into a desired size by the cutter 128. When cut papers are used, the cutter 128 is not required.

The decurled and cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the printing unit 112 and the sensor face of the print determination unit 124 forms a horizontal plane (flat plane).

The belt 133 has a width that is greater than the width of the recording paper 116, and a plurality of suction apertures (not shown) are formed on the belt surface. A suction chamber 134 is disposed in a position facing the sensor surface of the print determination unit 124 and the nozzle surface of the printing unit 112 on the interior side of the belt 133, which is set around the rollers 131 and 132, as shown in FIG. 9. The suction chamber 134 provides suction with a fan 135 to generate a negative pressure, and the recording paper 116 is held on the belt 133 by suction. In place of the suction system, an electrostatic attraction system can be employed.

The belt 133 is driven in the clockwise direction in FIG. 9 by the motive force of a motor 188 (not shown in FIG. 9, but shown in FIG. 14) being transmitted to at least one of the rollers 131 and 132, which the belt 133 is set around, and the recording paper 116 held on the belt 133 is conveyed from left to right in FIG. 9.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not shown, embodiments thereof include a configuration in which the belt is nipped with cleaning rollers such as a brush roller and a water absorbent roller, an air blow configuration in which clean air is blown onto the belt 133, or a combination of these. In the case of the configuration in which the belt 133 is nipped with the cleaning rollers, it is preferable to make the line velocity of the cleaning rollers different than that of the belt 133 to improve the cleaning effect.

The inkjet recording apparatus may comprise a roller nip conveyance mechanism, instead of the belt conveyance unit 122. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 140 is disposed on the upstream side of the printing unit 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 10:
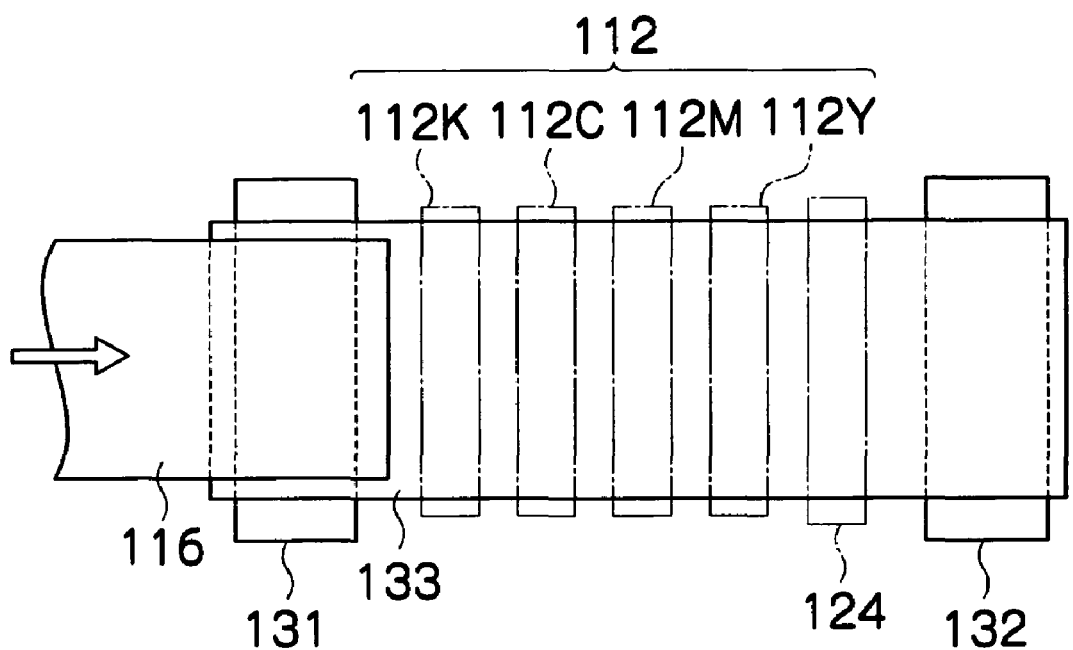
FIG. 10 is a principal plan diagram of the peripheral area of a print unit in the inkjet recording apparatus shown in FIG. 9.

The heads 112K, 112C, 112M and 112Y of the printing unit 112 are full line heads having a length corresponding to the maximum width of the recording paper 116 used with the inkjet recording apparatus 110, and comprising a plurality of nozzles for ejecting ink arranged on a nozzle face through a length exceeding at least one edge of the maximum-size recording medium (namely, the full width of the printable range) (see FIG. 10).

The print heads 112K, 112C, 112M and 112Y are arranged in this color order (black (K), cyan (C), magenta (M), yellow (Y)) from the upstream side in the feed direction of the recording paper 116, and these heads 112K, 112C, 112M and 112Y are fixed extending in a direction substantially perpendicular to the conveyance direction of the recording paper 116.

A color image can be formed on the recording paper 116 by ejecting inks of different colors from the heads 112K, 112C, 112M and 112Y, respectively, onto the recording paper 116 while the recording paper 116 is conveyed by the belt conveyance unit 122.

By adopting a configuration in which the full line heads 112K, 112C, 112M and 112Y having nozzle rows covering the full paper width are provided for the respective colors in this way, it is possible to record an image on the full surface of the recording paper 116 by performing just one operation of relatively moving the recording paper 116 and the printing unit 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 shown in FIG. 9 has an image sensor (line sensor or area sensor) for capturing an image of the droplet ejection result of the print unit 112, and functions as a device to check the ejection characteristics, such as blockages, depositing position error, and the like, of the nozzles, on the basis of the image of ejected droplets read in by the image sensor. A test pattern or the target image printed by the print heads 112K, 112C, 112M, and 112Y of the respective colors is read in by the print determination unit 124, and the ejection performed by each head is determined. The ejection determination includes the presence of the ejection, measurement of the dot size, and measurement of the dot depositing position.

A post-drying unit 142 is disposed following the print determination unit 124. The post-drying unit 142 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are preferably outputted separately. In the inkjet recording apparatus 110, a sorting device (not shown) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148. Although not shown in FIG. 9, the paper output unit 126A for the target prints is provided with a sorter for collecting prints according to print orders.

Structure of Head

Next, the structure of the head is described. The heads 112K, 112C, 112M and 112Y of the respective ink colors have the same structure, and a reference numeral 150 is hereinafter designated to any of the heads.

Figure 11A:
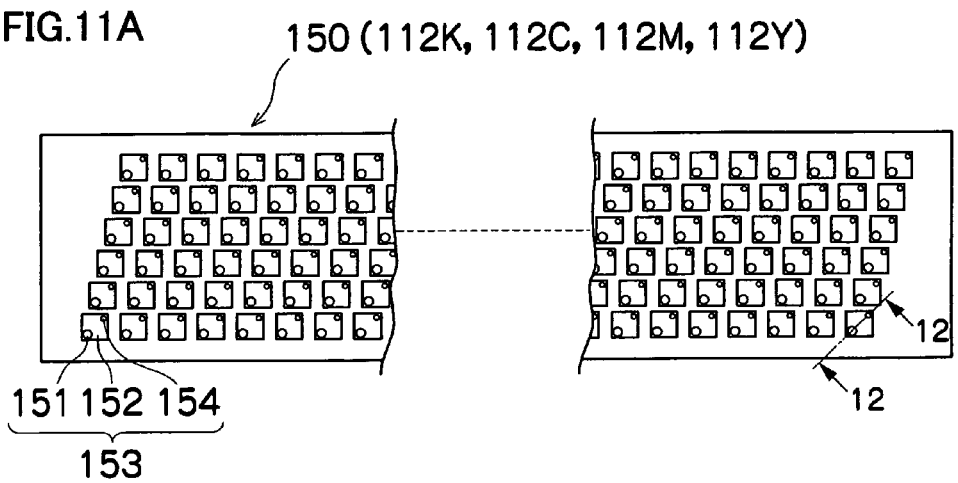
FIG. 11A is a plan view perspective diagram showing an embodiment of the composition of a print head.
Figure 11B:
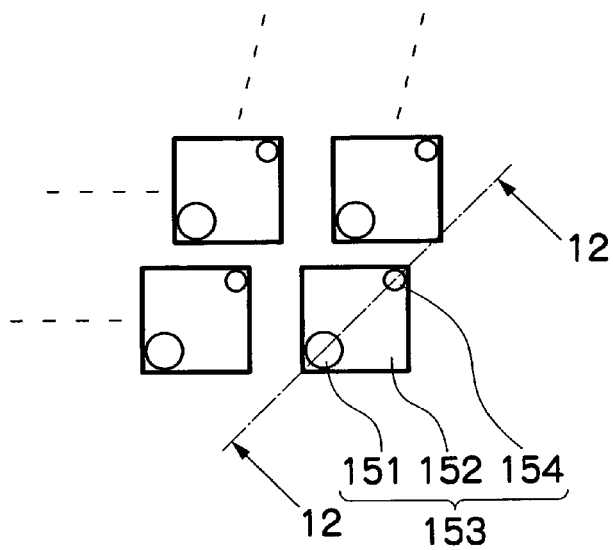
FIG. 11B is a principal enlarged view of FIG. 11A.
Figure 11C:
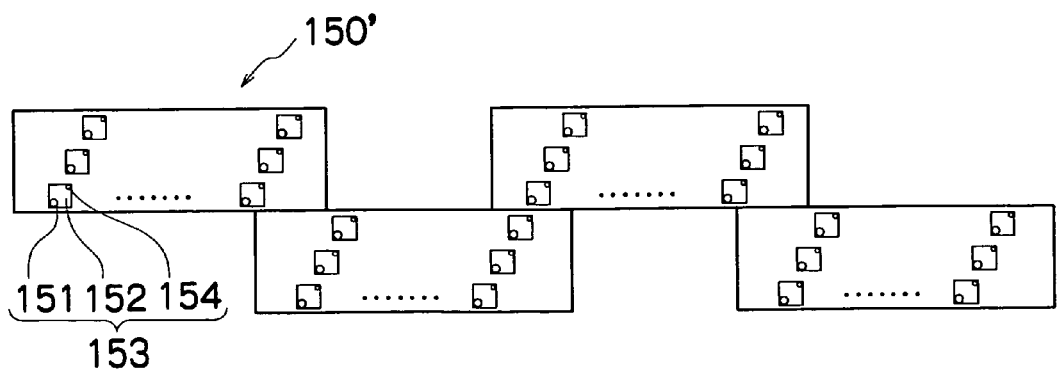
FIG. 11C is a plan view perspective diagram showing a further embodiment of the structure of a full line head.
Figure 12:
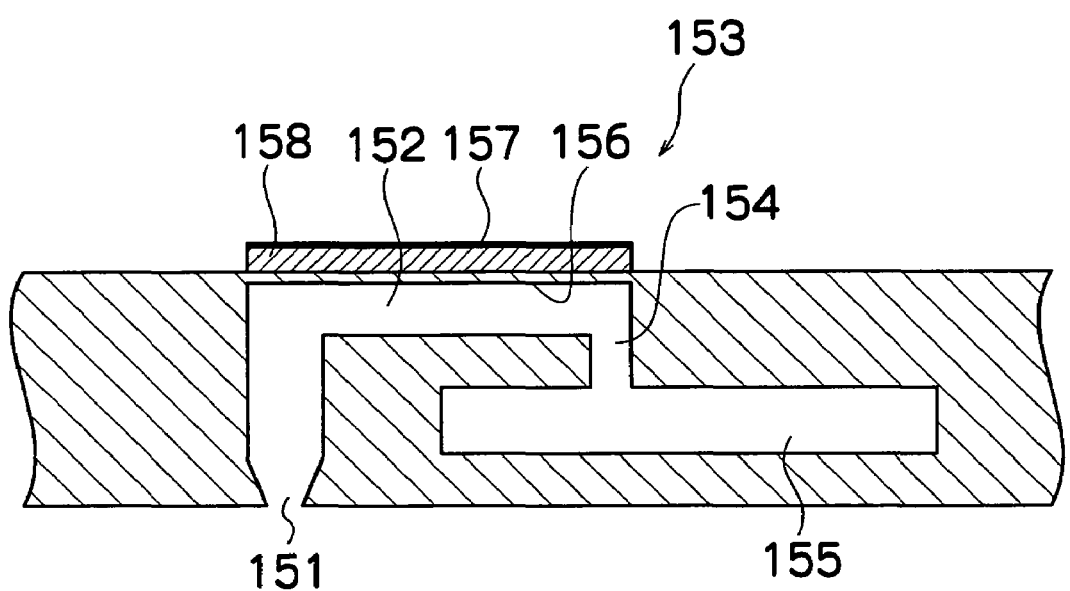
FIG. 12 is a cross-sectional view along line 12-12 in FIGS. 11A and 11B.

FIG. 11A is a perspective plan view showing an embodiment of the configuration of the head 150, FIG. 11B is an enlarged view of a portion thereof, FIG. 11C is a perspective plan view showing another embodiment of the configuration of the head 150, and FIG. 12 is a cross-sectional view taken along the line 12-12 in FIGS. 11A and 11B, showing the inner structure of a droplet ejection element (an ink chamber unit for one nozzle 151).

The nozzle pitch in the head 150 should be minimized in order to maximize the resolution of the dots printed on the surface of the recording paper 116. As shown in FIGS. 11A and 11B, the head 150 according to the present embodiment has a structure in which a plurality of ink chamber units (droplet ejection elements) 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the embodiment described above. For example, instead of the configuration in FIG. 11A, as shown in FIG. 11C, a line head having nozzle rows of a length corresponding to the entire width of the recording paper 116 can be formed by arranging and combining, in a staggered matrix, short head modules 150' each having a plurality of nozzles 151 arrayed in a two-dimensional fashion.

As shown in FIGS. 11A and 11B, the planar shape of the pressure chamber 152 provided corresponding to each nozzle 151 is substantially a square shape, and an outlet port to the nozzle 151 is provided at one of the ends of the diagonal line of the planar shape, while an inlet port (supply port) 154 for supplying ink is provided at the other end thereof. The shape of the pressure chamber 152 is not limited to that of the present embodiment and various modes are possible in which the planar shape is a quadrilateral shape (rhombic shape, rectangular shape, or the like), a pentagonal shape, a hexagonal shape, or other polygonal shape, or a circular shape, elliptical shape, or the like.

As shown in FIG. 12, each pressure chamber 152 is connected to a common channel 155 through the supply port 154. The common channel 155 is connected to an ink tank (not shown), which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 12, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuator 158, it is possible to adopt a piezoelectric element using a piezoelectric body, such as lead zirconate titanate, barium titanate, or the like. When the actuator 158 returns to its original position after ejecting ink by the displacement, the pressure chamber 152 is replenished with new ink from the common flow channel 155, through the supply port 154.

Figure 13:
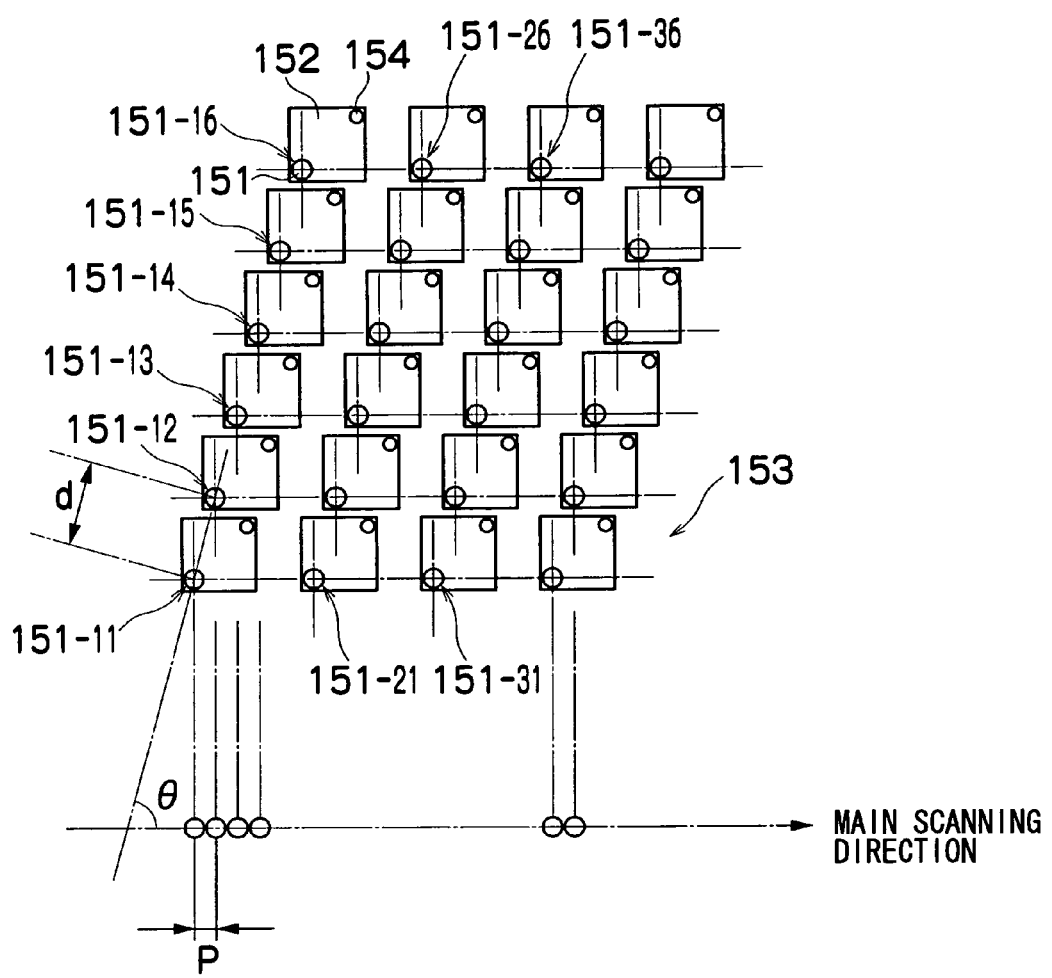
FIG. 13 is an enlarged view showing a nozzle arrangement in the print head shown in FIG. 11A.

As shown in FIG. 13, the high-density nozzle head according to the present embodiment is achieved by arranging the plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting the structure in which the plurality of ink chamber units 153 are arranged at a uniform pitch d in line with a direction forming the angle of θ with respect to the main scanning direction, the pitch P of the nozzles projected so as to align in the main scanning direction is d×cos θ, and hence the nozzles 151 can be regarded to be equivalent to those arranged linearly at the fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that shown in FIG. 13 are driven, the main scanning according to the above-described (3) is preferred. More specifically, the nozzles 151-11, 151-12, 151-13, 151-14, 151-15 and 151-16 are treated as a block (additionally; the nozzles 151-21, 151-22, . . . , 151-26 are treated as another block; the nozzles 151-31, 151-32, . . . , 151-36 are treated as another block; . . . ); and one line is printed in the width direction of the recording paper 116 by sequentially driving the nozzles 151-11, 151-12, . . . , 151-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is referred to as the "main scanning direction", and the direction in which sub-scanning is performed, is referred to as the "sub-scanning direction". In other words, in the present embodiment, the conveyance direction of the recording paper 116 is referred to as the sub-scanning direction and the direction perpendicular to same is referred to as the main scanning direction.

In implementing the present invention, the arrangement of the nozzles is not limited to that of the embodiment shown. Moreover, a method is employed in the present embodiment where an ink droplet is ejected by means of the deformation of the actuator 158, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 14:
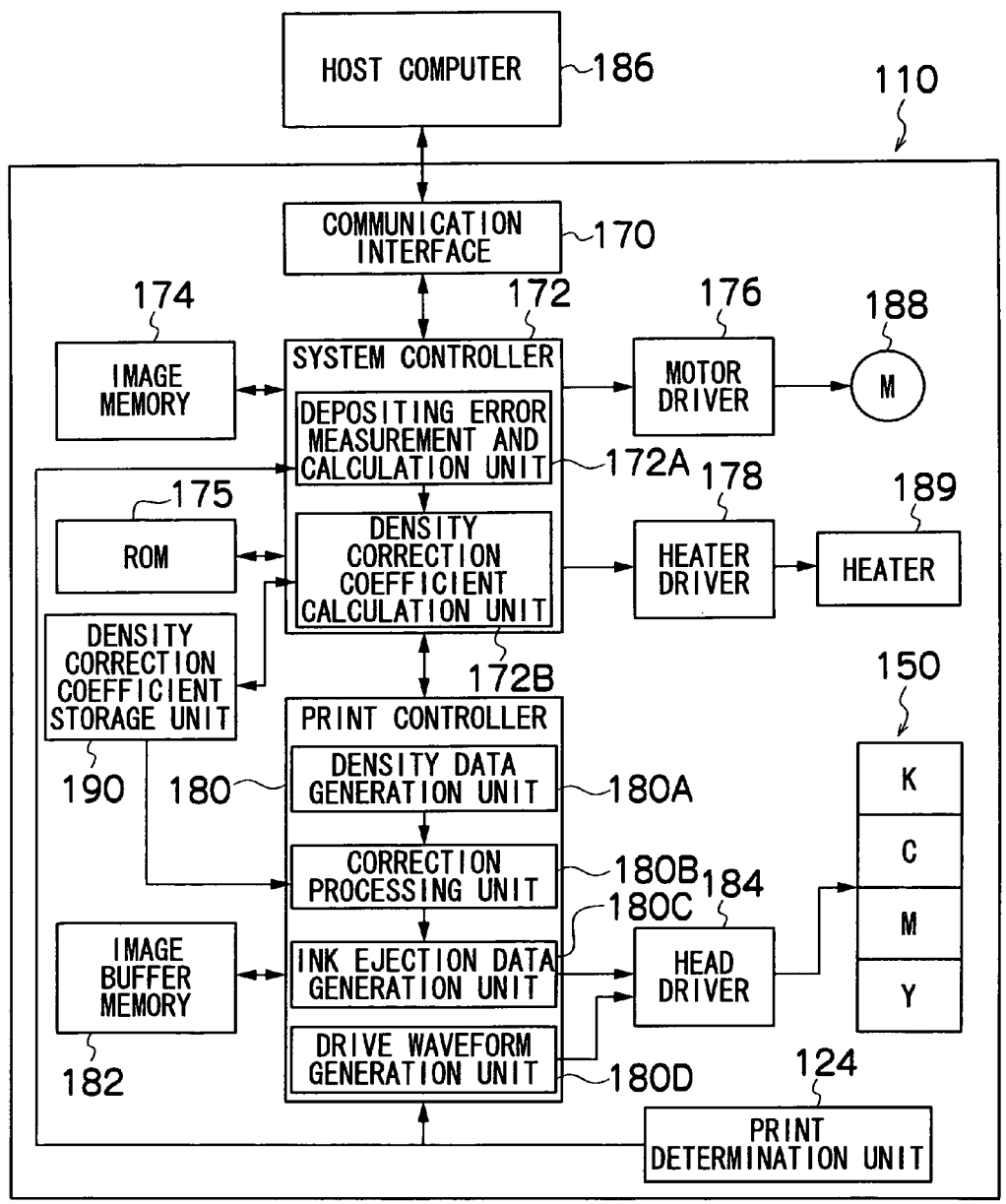
FIG. 14 is a principal block diagram showing the system configuration of the inkjet recording apparatus.
Figure 15:
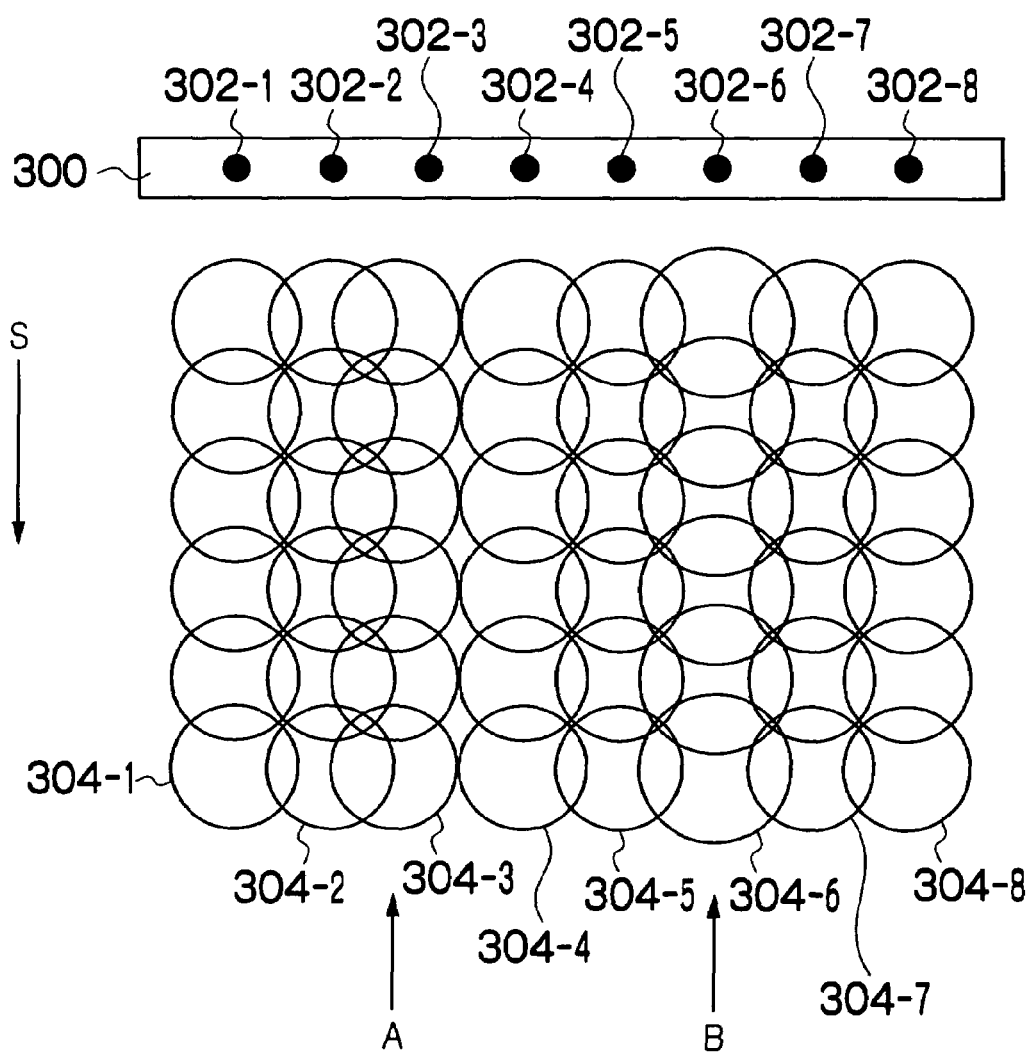
FIG. 15 is a schematic drawing for describing the relationship between variation in the ejection characteristics of the nozzles, and density non-uniformity.

FIG. 14 is a block diagram showing the system configuration of the inkjet recording apparatus 110. The inkjet recording apparatus 110 comprises a communication interface 170, a system controller 172, an image memory 174, a ROM 175, a motor driver 176, a heater driver 178, a print controller 180, an image buffer memory 182, a head driver 184, and the like.

The communication interface 170 is an interface unit (image input device) for receiving image data sent from a host computer 186. A serial interface such as USB (Universal Serial Bus), IEEE1394, Ethernet, and wireless network, or a parallel interface such as a Centronics interface may be used as the communication interface 170. A buffer memory (not shown) may be mounted in this portion in order to increase the communication speed.

The image data sent from the host computer 186 is received by the inkjet recording apparatus 110 through the communication interface 170, and is temporarily stored in the image memory 174. The image memory 174 is a storage device for storing images inputted through the communication interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communication interface 170, image memory 174, motor driver 176, heater driver 178, and the like, as well as controlling communications with the host computer 186 and writing and reading to and from the image memory 174 and the ROM 175, and it also generates control signals for controlling the motor 188 and heater 189 of the conveyance system.

Furthermore, the system controller 172 comprises a depositing error measurement and calculation unit 172A, which performs calculation processing for generating depositing position error data from the data read in from the test pattern by the print determination unit 124, and a density correction coefficient calculation unit 172B, which calculates density correction coefficients from the information relating to the depositing position error thus obtained. The processing functions of the depositing error measurement and calculation unit 172A and the density correction coefficient calculation unit 172B can be achieved by means of an ASIC (application specific integrated circuit), software, or a suitable combination of same.

The density correction coefficient data obtained by the density correction coefficient calculation unit 172B is stored in a density correction coefficient storage unit 190.

The program executed by the CPU of the system controller 172 and the various types of data (including data of the test pattern for obtaining depositing position error) which are required for control procedures are stored in the ROM 175. The ROM 175 may be a non-writeable storage device, or it may be a rewriteable storage device, such as an EEPROM. By utilizing the storage region of this ROM 175, the ROM 175 can be configured to be able to serve also as the density correction coefficient storage unit 190.

The image memory 174 is used as a temporary storage region for the image data, and it is also used as a program development region and a calculation work region for the CPU.

The motor driver (drive circuit) 176 drives the motor 188 of the conveyance system in accordance with commands from the system controller 172. The heater driver (drive circuit) 178 drives the heater 189 of the post-drying unit 142 or the like in accordance with commands from the system controller 172.

The print controller 180 is a control unit which functions as a signal processing device for performing various treatment processes, corrections, and the like, in accordance with the control implemented by the system controller 172, in order to generate a signal for controlling droplet ejection from the image data (multiple-value input image data) in the image memory 174, as well as functioning as a drive control device which controls the ejection driving of the head 150 by supplying the ink ejection data thus generated to the head driver 184.

In other words, the print controller 180 includes a density data generation unit 180A, a correction processing unit 180B, an ink ejection data generation unit 180C and a drive waveform generation unit 180D. These functional units (180A to 180D) can be realized by means of an ASIC, software or a suitable combination of same.

The density data generation unit 180A is a signal processing device which generates initial density data for the respective ink colors, from the input image data, and it carries out density conversion processing (including UCR processing and color conversion) described in step S22 in FIG. 6, and, where necessary, it also performs pixel number conversion processing.

The correction processing unit 180B in FIG. 14 is a processing device which performs density correction calculations using the density correction coefficients stored in the density correction coefficient storage unit 190, and it carries out the non-uniformity correction processing described in step S32 in FIG. 6.

The ink ejection data generation unit 180C in FIG. 14 is a signal processing device which includes a half-toning processing device for converting the corrected density data generated by the correction processing unit 180B into binary (or multiple-value) dot data, and it performs the binary (or multiple-value) conversion processing described in step S42 of FIG. 6. The ink ejection data generated by the ink ejection data generation unit 180C is supplied to the head driver 184, which controls the ink ejection operation of the head 150 accordingly.

The drive waveform generation unit 180D is a device for generating drive signal waveforms in order to drive the actuators 158 (see FIG. 12) corresponding to the respective nozzles 151 of the head 150. The signal (drive waveform) generated by the drive waveform generation unit 180D is supplied to the head driver 184. The signal outputted from the drive signal generation unit 180D may be digital waveform data, or it may be an analog voltage signal.

The image buffer memory 182 is provided in the print controller 180, and image data, parameters, and other data are temporarily stored in the image buffer memory 182 when image data is processed in the print controller 180. FIG. 14 shows a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is inputted from an external source through the communication interface 170, and is accumulated in the image memory 174. At this stage, multiple-value RGB image data is stored in the image memory 174, for example.

In this inkjet recording apparatus 110, an image which appears to have a continuous tonal graduation to the human eye is formed by changing the deposition density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 174 is sent to the print controller 180, through the system controller 172, and is converted to the dot data for each ink color by a half-toning technique, using dithering, error diffusion, or the like, by passing through the density data generation unit 180A, the correction processing unit 180B, and the ink ejection data generation unit 180C of the print controller 180.

In other words, the print controller 180 performs processing for converting the input RGB image data into dot data for the four colors of K, C, M and Y. The dot data thus generated by the print controller 180 is stored in the image buffer memory 182. This dot data of the respective colors is converted into CMYK droplet ejection data for ejecting ink from the nozzles of the head 150, thereby establishing the ink ejection data to be printed.

The head driver 184 outputs drive signals for driving the actuators 158 corresponding to the nozzles 151 of the head 150 in accordance with the print contents, on the basis of the ink ejection data and the drive waveform signals supplied by the print controller 180. A feedback control system for maintaining constant drive conditions in the head may be included in the head driver 184.

By supplying the drive signals outputted by the head driver 184 to the head 150 in this way, ink is ejected from the corresponding nozzles 151. By controlling ink ejection from the print head 150 in synchronization with the conveyance speed of the recording paper 116, an image is formed on the recording paper 116.

As described above, the ejection volume and the ejection timing of the ink droplets from the respective nozzles are controlled through the head driver 184, on the basis of the ink ejection data generated by implementing prescribed signal processing in the print controller 180, and the drive signal waveform. By this means, prescribed dot size and dot positions can be achieved.

As described with reference to FIG. 9, the print determination unit 124 is a block including an image sensor, which reads in the image printed on the recording medium 116, performs various signal processing operations, and the like, and determines the print situation (presence/absence of ejection, variation in droplet ejection, optical density, and the like), these determination results being supplied to the print controller 180 and the system controller 172.

The print controller 180 implements various corrections with respect to the head 150, on the basis of the information obtained from the print determination unit 124, according to requirements, and it implements control for carrying out cleaning operations (nozzle restoring operations), such as preliminary ejection, suctioning, or wiping, as and when necessary.

In the case of this embodiment, the combination of the print determination unit 124 and the depositing error measurement calculation unit 172A corresponds to the "characteristics information acquisition device", and the density correction coefficient calculation unit 172B corresponds to the "correction object recording element specification device" which specifies the recording elements (nozzles) that are to be corrected, and to the "correction range setting device" and the "correction coefficient specification device". Furthermore, the correction processing unit 180B corresponds to the "correction processing device".

According to the inkjet recording apparatus 110 having the foregoing composition, it is possible to obtain a satisfactory image in which density non-uniformity caused by error in depositing position is reduced.

Modification Example

It is also possible to adopt a mode in which all or a portion of the functions carried out by the depositing error measurement calculation unit 172A, the density correction coefficient calculation unit 172B, the density data generation unit 180A, and the correction processing unit 180B, which are described in FIG. 14, are installed in the host computer 186.

Furthermore, the range of application of the present invention is not limited to the correction of density non-uniformities caused by error in depositing position, and a correction effect can also be obtained by applying a method similar to the above-described correction processing to density non-uniformities caused by droplet volume errors, density non-uniformities caused by the presence of nozzles suffering ejection failure, density non-uniformities caused by periodic print errors, and density non-uniformities caused by various other types of factors.

Moreover, the application of the present invention is not limited to a line head type of printer, and beneficial correction effects can also be obtained with respect to streaks in a serial (or shuttle) scanning type of printer.

Embodiment using General Model

The foregoing description relates to the embodiment which uses the δ function model as the print model, but the print model is not limited to this. A case using a general model which assumes any general density profile is described below.

When using a general model, the composition is substantially the same as that when using the δ function model, but the equations used in the calculation process are different.

In the case of a general model, the density profile is expressed by the following general formula:

$$z(x). \tag{28}$$

Here, this function satisfies the following equations (29) and (30):

$$\int_{-\infty}^{\infty} z(x)dx = 1; \text{ and} \tag{29}$$

$$\int_{-\infty}^{\infty} x \cdot z(x)dx = 0. \tag{30}$$

The equation (29) indicates the normalization conditions, and the equation (30) indicates the symmetry conditions. The dot model expressed by the formula (28) is modified in accordance with the droplet volume and the type of recording medium.

By Fourier transform on the density profile after correction using this general model, the following equation is obtained:

$$T(f) = \int_{-\infty}^{\infty} D(x) \cdot e^{ifx} dx = \sum_i D_i \cdot \int_{-\infty}^{\infty} z(x - x_i) \cdot e^{ifx} dx. \tag{31}$$

This equation (31) corresponds to the above-described equation (12). As stated previously, minimizing the visibility of density non-uniformities means minimizing the low-frequency components of the power spectrum expressed by the above-described equation (13), and therefore in arithmetical terms, it corresponds to reducing the differential coefficients (of first-order, second-order, . . . ) for f=0 in T(f), to zero.

In other words, the correction conditions are as described below:

DC component $T(f = 0) = 1$  (32)

(condition for preserving the DC component);

First-order coefficient $\frac{d}{df}T(f=0) = 0$;  (33)

Second-order coefficient $\frac{d^2}{df^2}T(f=0) = 0$;  (34)

...

$(N-1)$-th order coefficient $\frac{d^{N-1}}{df^{N-1}}T(f=0) = 0$.  (35)

If calculation is made for the above correction conditions using the general model in the formula (28), then the following group of conditions (group of equations) is obtained:

$$\sum D_i = 1;  \quad (36)$$

$$\sum D_i \cdot \int_{-\infty}^{\infty} x \cdot z(x - x_i) dx = \sum D_i \cdot \int_{-\infty}^{\infty} (x + x_i) \cdot z(x) dx  \quad (37)$$
$$= \sum D_i \cdot x_i = 0;$$

$$\sum D_i \cdot \int_{-\infty}^{\infty} x^2 \cdot z(x - x_i) dx = \sum D_i \cdot \int_{-\infty}^{\infty} (x + x_i)^2 \cdot z(x) dx  \quad (38)$$
$$= \sum D_i \cdot \left( x_i^2 + \int_{-\infty}^{\infty} x^2 \cdot z(x) dx \right)$$
$$= 0;$$

...

$$\sum D_i \cdot \int_{-\infty}^{\infty} x^{N-1} \cdot z(x - x_i) dx = 0.  \quad (39)$$

The N simultaneous equations (36) to (39) are thus obtained. Comparing these simultaneous equations (36) to (39) with the simultaneous equations (18) to (21) of the δ function model, the equations for the zeroth-order and first-order differential coefficients are the same, and the equations from the second-order coefficients onwards are different. By deriving numerical solutions to the simultaneous equations (36) to (39), the density correction coefficients are found.

Embodiment using Hemispherical Model

A hemispherical model is useful as a model that is close to the shape of an actual dot and that allows analytical calculation. In the case of the hemispherical model, the density profile is expressed by the following general formula:

$$z(x) = \frac{2}{\pi r^2} \sqrt{1 - \left(\frac{x}{r}\right)^2},  \quad (40)$$

where r is the radius of the droplet when deposited (dot radius).

The condition formula for the second-order differential coefficients in the correction conditions are written as follows:

$$\sum D_i \cdot \left( x_i^2 + \int_{-\infty}^{\infty} x^2 \cdot z(x) dx \right) = \sum D_i \cdot x_i^2 + \sum D_i \cdot \frac{r^2}{4}  \quad (41)$$
$$= \sum D_i \cdot x_i^2 + \frac{r^2}{4}$$
$$= 0.$$

Hence, the simultaneous equations in the case of N=3, for example, are written as follows:

$$\sum D_i = 1;  \quad (42)$$

$$\sum D_i \cdot x_i = 0; \text{ and}  \quad (43)$$

$$\sum D_i \cdot x_i^2 = -\frac{r^2}{4}.  \quad (44)$$

As the value of N increases, the equations become more complicated. The simultaneous equations for the general value of N do not yield precise solutions in the same way as the δ function model, and therefore it is necessary to find solutions by numerical calculation.

Selective Changing of Print Models

As stated previously, if there is a change in the type of recording medium or the droplet size (ejected droplet volume), or the like, then the recording state, such as the dot diameter (depositing diameter) also changes in accordance with these recording conditions. Therefore, desirably, a plurality of print models corresponding to various types of recording states are prepared, and the print model suited to the current recording state is used selectively.

In one embodiment of a composition for achieving this, a plurality of recording conditions, and data for the plurality of print models corresponding to the recording states created by the recording conditions, are stored in a storage device such as an EEPROM (e.g., the ROM 175 in FIG. 14), and a system controller (e.g., the system controller 172 in FIG. 14) is used which is programmed to read out a print model matched to the prevailing conditions (recording state), in accordance with the type of recording medium and the droplet size, and to calculate the density correction coefficients by means of this print model. In this case, the system controller corresponds to the "print model changing device for selecting the print model".

Application to Multiple-Value (Multiple Dot Size) System

The embodiments described thus far relate to embodiments in which recording is controlled by means of two values (dot on or dot off), which indicates whether a dot of a single size is to be ejected or not. However, similar correction may also be applied to a head that is capable of recording dots of a plurality of sizes (a so-called "multiple-value head"). In the case of the multiple-value head, if an approximation is assumed in which "the δ function model is used" and "the depositing position error is the same for all dots deposited by the same nozzle, regardless of the dot size", then the calculated density correction coefficients do not differ at all from that described above.

However, if conditions where "the hemispherical model is used" and "there are fine differences in the depositing position error according to dot size" are taken into account, then it is necessary to calculate the density correction coefficients while incorporating these conditions.

For example, the output is taken to have four values (three dot sizes), and the dot sizes are referred to as "Large", "Middle" and "Small", starting from the biggest.

According to the prescribed half-tone processing, dots of the plurality of sizes are recorded in a combined fashion on the print medium. Therefore, the density correction coefficients for correcting the depositing position error of the respective dot sizes are determined for the dot sizes, and the density correction coefficients are weighted and averaged in accordance with the density ratios of the dot sizes, thereby deriving optimal density correction coefficients. The specific procedure is as follows.

(1) The relationship between the input data and the dot ratios of the respective sizes is stored in a table, which is saved in a storage device such as a memory.
(2) The density ratio of the respective dot sizes (the ratio of the optical density measured when the same number of dots are printed) is stored.
(3) For the dot sizes, density correction coefficients $d_{Large}(i)$, $d_{Middle}(i)$ and $d_{Small}(i)$ are generated on the basis of the depositing position and the depositing diameters (in the case of the hemispherical model) for the dot sizes.
(4) The dot ratio is settled from the input image data on the basis of the table in (1), and the density ratio corresponding to the dot sizes ($D_{Large}$: $D_{Middle}$: $D_{Small}$) is found. Here, $D_{Large}$, $D_{Middle}$ and $D_{Small}$ are all positive values, and $D_{Large}+D_{Middle}+D_{Small}=1$.
(5) The density correction coefficients for the dot sizes found in (3) are weighted and averaged in accordance with the density ratio found in (4), and the density correction coefficients d(i) for the nozzles are derived from the following equation:

$$d(i)=D_{Large} \times d_{Large}(i)+D_{Middle} \times d_{Middle}(i)+D_{Small} \times d_{Small}(i). \quad (45)$$

The subsequent processing is similar to that of the binary system, and therefore further description thereof is omitted here.

In the foregoing embodiments, an inkjet recording apparatus is described as one embodiment of an image forming apparatus, but the range of application of the present invention is not limited to this. It is also possible to apply the present invention to image recording apparatuses of various types apart from the inkjet system, such as a thermal transfer recording apparatus equipped with a recording head that uses thermal elements as recording elements, an LED (light-emitting diode) electrophotographic printer equipped with a recording head having LED elements as recording elements, or a silver halide photographic printer having an LED line type exposure head, or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:
   a recording head which has a plurality of recording elements;
   a conveyance device which causes the recording head and a recording medium to move relatively to each other by conveying at least one of the recording head and the recording medium;
   a characteristics information acquisition device which acquires information that indicates recording characteristics of the recording elements;
   a correction object recording element specification device which specifies a correction object recording element from among the plurality of recording elements, a density non-uniformity caused by the recording characteristic of the correction object recording element being corrected;
   a correction range setting device which sets N correction recording elements (where N is an integer larger than 1) from among the plurality of recording elements, the N correction recording elements being used in correction of output density;
   a correction coefficient specification device which calculates the density non-uniformity caused by the recording characteristic of the correction object recording element, and specifies density correction coefficients for the N correction recording elements according to correction conditions that reduce a low-frequency component of a power spectrum representing spatial frequency characteristics of the calculated density non-uniformity;
   a correction processing device which performs calculation for correcting the output density by using the density correction coefficients specified by the correction coefficient specification device; and
   a drive control device which controls driving of the recording elements according to correction results produced by the correction processing device.

2. The image recording apparatus as defined in claim 1, wherein the correction conditions are conditions where differential coefficients at a frequency origin point (f=0) in the power spectrum representing the spatial frequency characteristics of the density non-uniformity become substantially zero.

3. The image recording apparatus as defined in claim 2, wherein the correction conditions are expressed by N simultaneous equations obtained according to conditions for preserving a DC component of the spatial frequency, and conditions at which the differential coefficients up to (N−1)-th order become substantially zero.

4. The image recording apparatus as defined in claim 1, wherein the recording characteristics include recording position error.

5. The image recording apparatus as defined in claim 4, wherein the density correction coefficients for the recording elements are specified by the following equation:

$$d_i = \begin{cases} \dfrac{\prod_k x_k}{x_i \cdot \prod_{k \neq i}(x_k - x_i)} - 1 & \text{(for the correction object recording element)} \\ \dfrac{\prod_k x_k}{x_i \cdot \prod_{k \neq i}(x_k - x_i)} & \text{(for the recording elements other than the correction object recording element),} \end{cases}$$

where i is an index identifying a position of the recording element, $d_i$ is the density correction coefficient for the recording element i, and $x_i$ is a recording position of the recording element i.

6. The image recording apparatus as defined in claim 4, wherein:
   i and k are indexes identifying the recording elements;
   in relation to the recording position error of the recording element k, the density correction coefficients are determined for the N recording elements including the recording element k and the recording elements surrounding the recording element k;

d(i, k) is the density correction coefficient for the recording element i in relation to the recording position error of the recording element k; and a total density correction coefficient $d_i$ for the recording element i is obtained by linear combination of d(i, k) taking the index k as a variable.

7. The image recording apparatus as defined in claim 6, wherein:

a lower limit d_min and an upper limit d_max are designated for a value of the total density correction coefficient $d_i$; and a value of N is set in such a manner that a relationship of d_min<$d_i$<d_max is satisfied.

8. The image recording apparatus as defined in claim 1, further comprising:

a storage device which stores a print model of the recording elements, wherein the correction coefficient specification device specifies the density correction coefficients according to the print model.

9. The image recording apparatus as defined in claim 8, wherein:

the storage device stores a plurality of print models of the recording elements; and the image recording apparatus further comprises a print model changing device which selects one of the print models according to a recording state of the recording elements.

10. The image recording apparatus as defined in claim 8, wherein the print model includes a hemispherical model.

11. An image recording method for recording an image on a recording medium by a plurality of recording elements of a recording head while causing the recording head and the recording medium to move relatively to each other by conveying at least one of the recording head and the recording medium, the method comprising:

acquiring information that indicates recording characteristics of the recording elements;

specifying a correction object recording element from among the plurality of recording elements, a density non-uniformity caused by the recording characteristic of the correction object recording element being corrected;

setting N correction recording elements (where N is an integer larger than 1) from among the plurality of recording elements, the N correction recording elements being used in correction of output density;

calculating the density non-uniformity caused by the recording characteristic of the correction object recording element, and specifying density correction coefficients for the N correction recording elements according to correction conditions that reduce a low-frequency component of a power spectrum representing spatial frequency characteristics of the calculated density non-uniformity;

performing calculation for correcting the output density by using the density correction coefficients specified; and controlling driving of the recording elements according to correction results produced.

12. A method of specifying density correction coefficients, comprising:

acquiring information that indicates recording characteristics of a plurality of recording elements of a recording head;

specifying a correction object recording element from among the plurality of recording elements, a density non-uniformity caused by the recording characteristic of the correction object recording element being corrected;

setting N correction recording elements (where N is an integer larger than 1) from among the plurality of recording elements, the N correction recording elements being used in correction of output density; and calculating the density non-uniformity caused by the recording characteristic of the correction object recording element, and specifying density correction coefficients for the N correction recording elements according to correction conditions that reduce a low-frequency component of a power spectrum representing spatial frequency characteristics of the calculated density non-uniformity.

13. An image recording apparatus, comprising:

a characteristics information acquisition device acquiring information indicating recording characteristics of the recording elements;

a correction object recording element specification device specifying a correction object recording element from among the plurality of recording elements, a density non-uniformity caused by the recording characteristic of the correction object recording element being corrected;

a correction range setting device which sets N correction recording elements (where N is an integer larger than 1) from among the plurality of recording elements, the N correction recording elements being used in correction of output density; and a correction coefficient specification device which calculates the density non-uniformity caused by the recording characteristic of the correction object recording element, and specifies density correction coefficients for the N correction recording elements according to correction conditions that reduce a low-frequency component of a power spectrum representing spatial frequency characteristics of the calculated density non-uniformity.

* * * * *